US012389257B2

United States Patent
Xu et al.

(10) Patent No.: US 12,389,257 B2
(45) Date of Patent: Aug. 12, 2025

(54) CROSS-LINK INTERFERENCE MEASUREMENT CONFIGURATION

(71) Applicant: QUALCOMM Incorporated, San Diego, CA (US)

(72) Inventors: Huilin Xu, Temecula, CA (US); Ruifeng Ma, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/904,364

(22) PCT Filed: Apr. 10, 2020

(86) PCT No.: PCT/CN2020/084191
§ 371 (c)(1),
(2) Date: Aug. 16, 2022

(87) PCT Pub. No.: WO2021/203410
PCT Pub. Date: Oct. 14, 2021

(65) Prior Publication Data
US 2023/0057616 A1    Feb. 23, 2023

(51) Int. Cl.
*H04W 24/10*  (2009.01)
*H04B 17/336* (2015.01)
*H04W 56/00*  (2009.01)

(52) U.S. Cl.
CPC .......... *H04W 24/10* (2013.01); *H04B 17/336* (2015.01); *H04W 56/001* (2013.01)

(58) Field of Classification Search
None
See application file for complete search history.

(56) References Cited

U.S. PATENT DOCUMENTS 12,114,187 B2 *  10/2024  Shi ..................... H04W 24/08
2018/0323916 A1  11/2018  Yang et al.
(Continued)

FOREIGN PATENT DOCUMENTS

CN   108809577 A   11/2018
CN   109391995 A   2/2019
(Continued)

OTHER PUBLICATIONS

International Search Report and Written Opinion—PCT/CN2020/084191—ISA/EPO—Dec. 30, 2020 (203502WO1).
(Continued)

*Primary Examiner* — Otis L Thompson, Jr.
(74) *Attorney, Agent, or Firm* — Holland & Hart LLP

(57) ABSTRACT

Methods, systems, and devices for wireless communications are described. Generally, a base station may transmit, to a victim user equipment (UE) a configuration message indication one or more resource for measuring cross-link interference (CLI) from an aggressor UE. The configuration message may include one or more cell parameters, which may include an indication of a relationship between the serving cell of the victim UE and the serving cell of the aggressor UE. The victim UE may determine the relationship between the serving cells based on the received cell parameters, and may perform CLI measurements based thereon. In some cases, the UE may adjust a CLI measurement window, or may prioritize some aggressor UEs, based on the determined relationship. The UE may also transmit a CLI measurement report to the base station.

28 Claims, 17 Drawing Sheets

(56) References Cited

U.S. PATENT DOCUMENTS

| | | | | |
|---|---|---|---|---|
| 2019/0313418 | A1* | 10/2019 | Wang | H04W 72/04 |
| 2019/0363867 | A1* | 11/2019 | Kang | H04L 5/1469 |
| 2020/0389805 | A1 | 12/2020 | Kim et al. | |
| 2021/0409986 | A1* | 12/2021 | Wang | H04B 17/309 |
| 2022/0095240 | A1* | 3/2022 | Ying | H04B 17/336 |
| 2022/0159596 | A1* | 5/2022 | Kim | H04J 11/00 |
| 2022/0174528 | A1* | 6/2022 | Sedin | H04W 24/08 |
| 2022/0303108 | A1* | 9/2022 | Faxér | H04L 5/1461 |

FOREIGN PATENT DOCUMENTS

| | | |
|---|---|---|
| CN | 110383722 A | 10/2019 |
| CN | 110896562 A | 3/2020 |
| EP | 3567759 A1 | 11/2019 |
| EP | 3930367 A1 | 12/2021 |
| WO | WO-2018231127 A1 | 12/2018 |
| WO | WO-2021138827 A1 | 7/2021 |

OTHER PUBLICATIONS

CMCC : "Draft Summary on Study on NR-RIM," 3GPP TSG RAN WG1 Meeting #94bis, R1-1811884, Oct. 9, 2018 (Oct. 9, 2018), 36 pages, sections 2.1.1, 2.3.1.

Ericsson: "Remaining issues for RIM/CLI", 3GPP TSG-RAN WG2 #109-bis-e, R2-2003380, 3rd Generation Partnership Project, Mobile Competence Centre, 650, Route Des Lucioles, F-06921 Sophia-Antipolis Cedex, France, vol. RAN WG2, No. Online, Apr. 20, 2020-Apr. 30, 2020, Apr. 9, 2020, 4 Pages, XP052354346, p. 4.

Nokia, et al: "On Cross-link Interference Measurement Framework", 3GPP TSG RAN WG1 NR Ad-hoc #3, R1-1715747, 3rd Generation Partnership Project, Mobile Competence Centre, 650, Route Des Lucioles, F-06921 Sophia-Antipolis Cedex, vol. RAN WG1, No. Nagoya, Japan, Sep. 18, 2017-Sep. 21, 2017, Sep. 17, 2017, 6 pages, XP051339209, p. 2-p. 4, sections 1-3.

Supplementary European Search Report—EP20929776—Search Authority—Munich—Jan. 2, 2024 (203502EP).

* cited by examiner

Downlink Symbol (D) 225

Uplink Symbol (U) 235

Flexible Symbol (X) 230

200

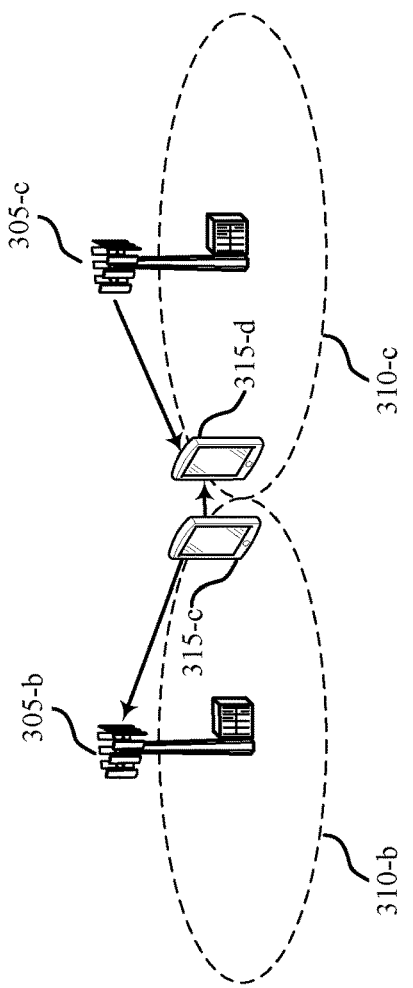
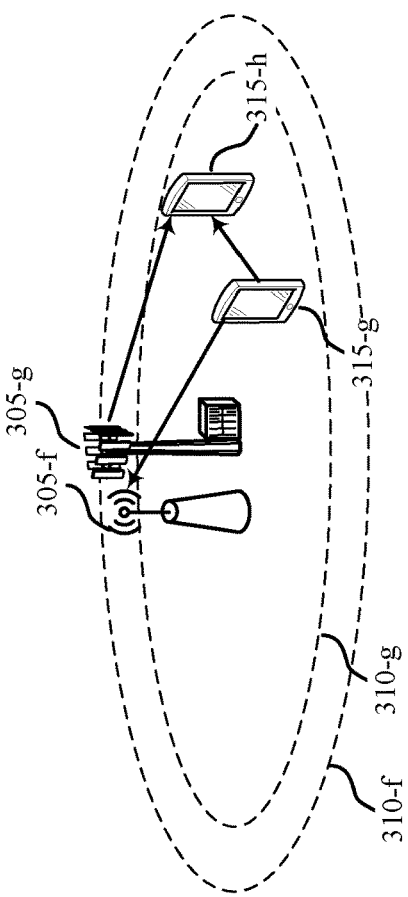
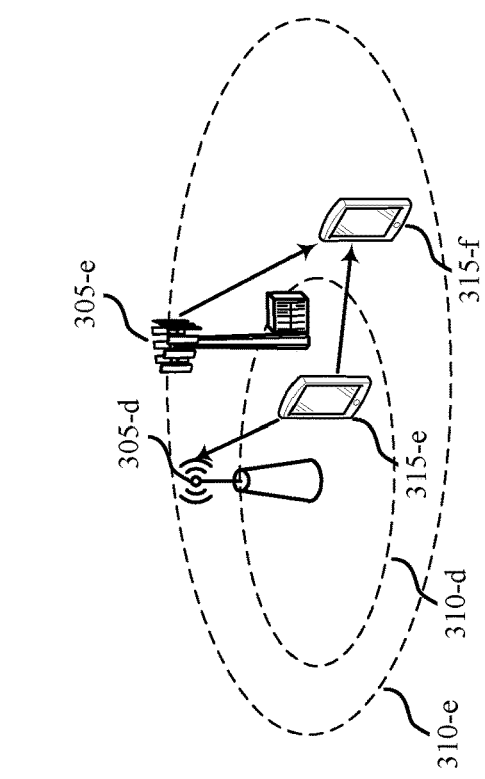
FIG. 3A
FIG. 3B
FIG. 3C
FIG. 3D

CROSS-LINK INTERFERENCE MEASUREMENT CONFIGURATION

CROSS REFERENCE

The present application is a 371 national stage filing of International PCT Application No. PCT/CN2020/084191 by Xu et al. entitled "CROSS-LINK INTERFERENCE MEASUREMENT CONFIGURATION," filed Apr. 10, 2020, which is assigned to the assignee hereof, and which is expressly incorporated by reference in its entirety herein.

FIELD OF TECHNOLOGY

The following relates generally to wireless communications and more specifically to cross-link interference measurement configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support cross-link interference measurement configuration. Generally, a user equipment (UE) may cause cross-link interference (CLI) to another UE. A base station may configure CLI measurement resources for measuring CLI, and a victim UE may perform CLI measurements during the CLI measurement resources. The base station may also configure the aggressor UE to transmit a signal (e.g., a sounding reference signal (SRS)) during the CLI measurement resources for measurement by the victim UE. However, in some cases, timing between the victim UE and the aggressor UE may be misaligned. In some cases, a UE may improve CLI measurements with information indicating a relationship of the aggressor UE to the serving cell. In addition, a UE may conserve power and improve system efficiency by prioritizing CLI measurements based on a relationship between serving cells of the victim and aggressor UEs. Thus, in the configuration message that indicates the CLI measurement resources, a base station may provide one or more cell parameters, which may include an indication of the relationship between the serving cells. The victim UE may determine the relationship between the serving cells based on the received cell parameters, and may perform CLI measurements based thereon. In some cases, the UE may adjust a CLI measurement window, or may prioritize some aggressor UEs, based on the determined relationship. The UE may also transmit a CLI measurement report to the base station.

A method of wireless communications at a first UE is described. The method may include receiving, from a base station, a configuration message including an indication of one or more resources for performing cross-link interference measurements of additional UEs, where the configuration message includes one or more cell parameters associated with the one or more of the additional UEs, determining, based on the one or more cell parameters, a relationship between a first serving cell associated with the first UE and a second serving cell associated with a second UE of the one or more of the additional UEs, and performing a cross-link interference measurement for the second UE during at least a portion of the one or more resources, based on the determined relationship.

An apparatus for wireless communications at a first UE is described. The apparatus may include a processor, memory coupled with the processor, and instructions stored in the memory. The instructions may be executable by the processor to cause the apparatus to receive, from a base station, a configuration message including an indication of one or more resources for performing cross-link interference measurements of additional UEs, where the configuration message includes one or more cell parameters associated with the one or more of the additional UEs, determine, based on the one or more cell parameters, a relationship between a first serving cell associated with the first UE and a second serving cell associated with a second UE of the one or more of the additional UEs, and perform a cross-link interference measurement for the second UE during at least a portion of the one or more resources, based on the determined relationship.

Another apparatus for wireless communications at a first UE is described. The apparatus may include means for receiving, from a base station, a configuration message including an indication of one or more resources for performing cross-link interference measurements of additional UEs, where the configuration message includes one or more cell parameters associated with the one or more of the additional UEs, determining, based on the one or more cell parameters, a relationship between a first serving cell associated with the first UE and a second serving cell associated with a second UE of the one or more of the additional UEs, and performing a cross-link interference measurement for the second UE during at least a portion of the one or more resources, based on the determined relationship.

A non-transitory computer-readable medium storing code for wireless communications at a first UE is described. The code may include instructions executable by a processor to receive, from a base station, a configuration message including an indication of one or more resources for performing cross-link interference measurements of additional UEs, where the configuration message includes one or more cell parameters associated with the one or more of the additional UEs, determine, based on the one or more cell parameters, a relationship between a first serving cell associated with the first UE and a second serving cell associated with a second UE of the one or more of the additional UEs, and perform a cross-link interference measurement for the second UE during at least a portion of the one or more resources, based on the determined relationship.

In some examples of the method, apparatuses, and non-transitory computer-readable medium described herein, the one or more cell parameters include one or more cell identity indicators.

In some examples of the method, apparatuses, and non-transitory computer-readable medium described herein, determining the relationship between the first serving cell and the second serving cell may include operations, features, means, or instructions for determining, based on the one or more cell identity indicators, that the first serving cell may be the same as the second serving cell.

Some examples of the method, apparatuses, and non-transitory computer-readable medium described herein may further include operations, features, means, or instructions for determining, based on determining that the first serving cell may be the same as the second serving cell, a correspondence between an uplink timing for the second UE and a downlink timing for the first UE, where performing the cross-link interference measurements may be based on the correspondence between the uplink timing for the second UE and the downlink timing for the first UE.

In some examples of the method, apparatuses, and non-transitory computer-readable medium described herein, determining the relationship between the first serving cell and the second serving cell may include operations, features, means, or instructions for determining, based on the one or more cell identity indicators, that the first serving cell may be different from the second serving cell.

Some examples of the method, apparatuses, and non-transitory computer-readable medium described herein may further include operations, features, means, or instructions for determining, based on determining that the first serving cell may be not the same as the second serving cell, an offset between an uplink timing for the second UE and a downlink timing for the first UE, and adjusting a cross-link interference measurement window based on the determined offset, where performing the cross-link interference measurement may be based on adjusting the cross-link interference measurement window.

In some examples of the method, apparatuses, and non-transitory computer-readable medium described herein, determining the offset between the uplink timing for the second UE and the uplink timing for the first UE may include operations, features, means, or instructions for determining a timing difference between a first synchronization block transmitted by the first serving cell and a second synchronization block transmitted by the second serving cell.

In some examples of the method, apparatuses, and non-transitory computer-readable medium described herein, the one or more cell identity indicators include a flag in the configuration message, where a first value of the flag indicates a first relationship between the first serving cell and the second serving cell, and a second value of the flag indicates a second relationship between the first serving cell and the second serving cell.

In some examples of the method, apparatuses, and non-transitory computer-readable medium described herein, the first cell may be associated with a first cell identifier, and the one or more cell identity indicators include a second serving cell identifier associated with the second serving cell.

In some examples of the method, apparatuses, and non-transitory computer-readable medium described herein, determining the relationship between the first serving cell and the second serving cell may include operations, features, means, or instructions for determining whether the first cell identifier may be the same as the second serving cell identifier.

In some examples of the method, apparatuses, and non-transitory computer-readable medium described herein, the one or more cell parameters includes a cell location indicator.

In some examples of the method, apparatuses, and non-transitory computer-readable medium described herein, determining the relationship between the first serving cell and the second serving cell may include operations, features, means, or instructions for determining, based on the cell location indicator, that the first serving cell and the second serving cell may be co-located.

Some examples of the method, apparatuses, and non-transitory computer-readable medium described herein may further include operations, features, means, or instructions for determining, based on determining that the first serving cell and the second serving cell may be co-located, a correspondence between an uplink timing for the second UE and a downlink timing for the first UE, where performing the cross-link interference measurements may be based on the correspondence between the uplink timing for the second UE and the downlink timing for the first UE.

In some examples of the method, apparatuses, and non-transitory computer-readable medium described herein, determining the relationship between the first serving cell and the second serving cell may include operations, features, means, or instructions for determining, based on the cell location indicator, that the first serving cell and the second serving cell may be not co-located.

Some examples of the method, apparatuses, and non-transitory computer-readable medium described herein may further include operations, features, means, or instructions for determining, based on determining that the first serving cell and the second serving cell may be not co-located, an offset between an uplink timing for the second UEs and a downlink timing for the first UE, and adjusting a cross-link interference measurement window based on the determined offset, where performing the cross-link interference measurement may be based on adjusting the cross-link interference measurement window.

In some examples of the method, apparatuses, and non-transitory computer-readable medium described herein, determining the offset between the uplink timing for the second UE and the uplink timing for the first UE may include operations, features, means, or instructions for determining a timing difference between a first synchronization block transmitted by the first serving cell and a second synchronization block transmitted by the second serving cell.

In some examples of the method, apparatuses, and non-transitory computer-readable medium described herein, the one or more cell parameters includes a cell overlap indicator.

In some examples of the method, apparatuses, and non-transitory computer-readable medium described herein, determining the relationship between the first serving cell and the second serving cell may include operations, features, means, or instructions for determining that an overlap between a first coverage area associated with the first serving cell and a second coverage area associated with the second serving cell satisfies a threshold, where performing the cross-link interference measurements may be based on determining that the overlap satisfies the threshold.

In some examples of the method, apparatuses, and non-transitory computer-readable medium described herein, determining the relationship between the first serving cell and the second serving cell may include operations, features, means, or instructions for determining that an overlap between a first coverage area associated with the first serving cell and a second coverage area associated with the second serving cell does not satisfy a threshold.

Some examples of the method, apparatuses, and non-transitory computer-readable medium described herein may further include operations, features, means, or instructions for determining a location of the first UE within a coverage area of the first serving cell, identifying, based on the location of the first UE, a subset of the additional UEs for performing the cross-link interference measurements, and refraining from performing cross-link interference measurements for UEs of the additional UEs not within the subset of the additional UEs.

Some examples of the method, apparatuses, and non-transitory computer-readable medium described herein may further include operations, features, means, or instructions for transmitting, to the base station, a cross-link interference report based on performing the cross-link measurements.

A method of wireless communications at a base station is described. The method may include identifying, for a first UE served by a first serving cell, one or more cell parameters for cross-link interference for additional UEs, transmitting, to the first UE, a configuration message including an indication of the one or more cell parameters and an indication of one or more resources for performing cross-link interference measurements, and receiving, from the first UE responsive to the configuration message, a cross-link interference measurement report.

An apparatus for wireless communications at a base station is described. The apparatus may include a processor, memory coupled with the processor, and instructions stored in the memory. The instructions may be executable by the processor to cause the apparatus to identify, for a first UE served by a first serving cell, one or more cell parameters for cross-link interference for additional UEs, transmit, to the first UE, a configuration message including an indication of the one or more cell parameters and an indication of one or more resources for performing cross-link interference measurements, and receive, from the first UE responsive to the configuration message, a cross-link interference measurement report.

Another apparatus for wireless communications at a base station is described. The apparatus may include means for identifying, for a first UE served by a first serving cell, one or more cell parameters for cross-link interference for additional UEs, transmitting, to the first UE, a configuration message including an indication of the one or more cell parameters and an indication of one or more resources for performing cross-link interference measurements, and receiving, from the first UE responsive to the configuration message, a cross-link interference measurement report.

A non-transitory computer-readable medium storing code for wireless communications at a base station is described. The code may include instructions executable by a processor to identify, for a first UE served by a first serving cell, one or more cell parameters for cross-link interference for additional UEs, transmit, to the first UE, a configuration message including an indication of the one or more cell parameters and an indication of one or more resources for performing cross-link interference measurements, and receive, from the first UE responsive to the configuration message, a cross-link interference measurement report.

In some examples of the method, apparatuses, and non-transitory computer-readable medium described herein, the one or more cell parameters include one or more cell identity indicators.

In some examples of the method, apparatuses, and non-transitory computer-readable medium described herein, the one or more identity indicators include an indication that the first serving cell may be the same as the second serving cell.

In some examples of the method, apparatuses, and non-transitory computer-readable medium described herein, the one or more identity indicators include an indication that the first serving cell may be different from the second serving cell.

In some examples of the method, apparatuses, and non-transitory computer-readable medium described herein, the one or more cell identity indicators include a flag in the configuration message, where a first value of the flag indicates a first relationship between the first serving cell and the second serving cell, and a second value of the flag indicates a second relationship between the first serving cell and the second serving cell.

In some examples of the method, apparatuses, and non-transitory computer-readable medium described herein, the first cell may be associated with a first cell identifier, and the one or more cell identity indicators include a second serving cell identifier associated with the second serving cell.

In some examples of the method, apparatuses, and non-transitory computer-readable medium described herein, the one or more cell parameters include a cell location indicator.

In some examples of the method, apparatuses, and non-transitory computer-readable medium described herein, the cell location indicator includes an indication that the first serving cell and the second serving cell may be co-located.

In some examples of the method, apparatuses, and non-transitory computer-readable medium described herein, the cell location indicator includes an indication that the first serving cell and the second serving cell may be not co-located.

In some examples of the method, apparatuses, and non-transitory computer-readable medium described herein, the one or more cell parameters include a cell overlap indicator.

In some examples of the method, apparatuses, and non-transitory computer-readable medium described herein, the cell overlap indicator includes an indication that an overlap between a first coverage area associated with the first serving cell and a second coverage area associated with the second serving cell satisfies a threshold.

In some examples of the method, apparatuses, and non-transitory computer-readable medium described herein, the cell overlap indicator includes an indication that an overlap between a first coverage area associated with the first serving cell and a second coverage area associated with the second serving cell does not satisfy a threshold.

BRIEF DESCRIPTION OF THE DRAWINGS

FIG. 3A illustrates an example of a wireless communications system that supports cross-link interference measurement configuration in accordance with aspects of the present disclosure.

FIG. 3B illustrates an example of a wireless communications system that supports cross-link interference measurement configuration in accordance with aspects of the present disclosure.

FIG. 3C illustrates an example of a wireless communications system that supports cross-link interference measurement configuration in accordance with aspects of the present disclosure.

FIG. 3D illustrates an example of a wireless communications system that supports cross-link interference measurement configuration in accordance with aspects of the present disclosure.

DETAILED DESCRIPTION

Figure 1:
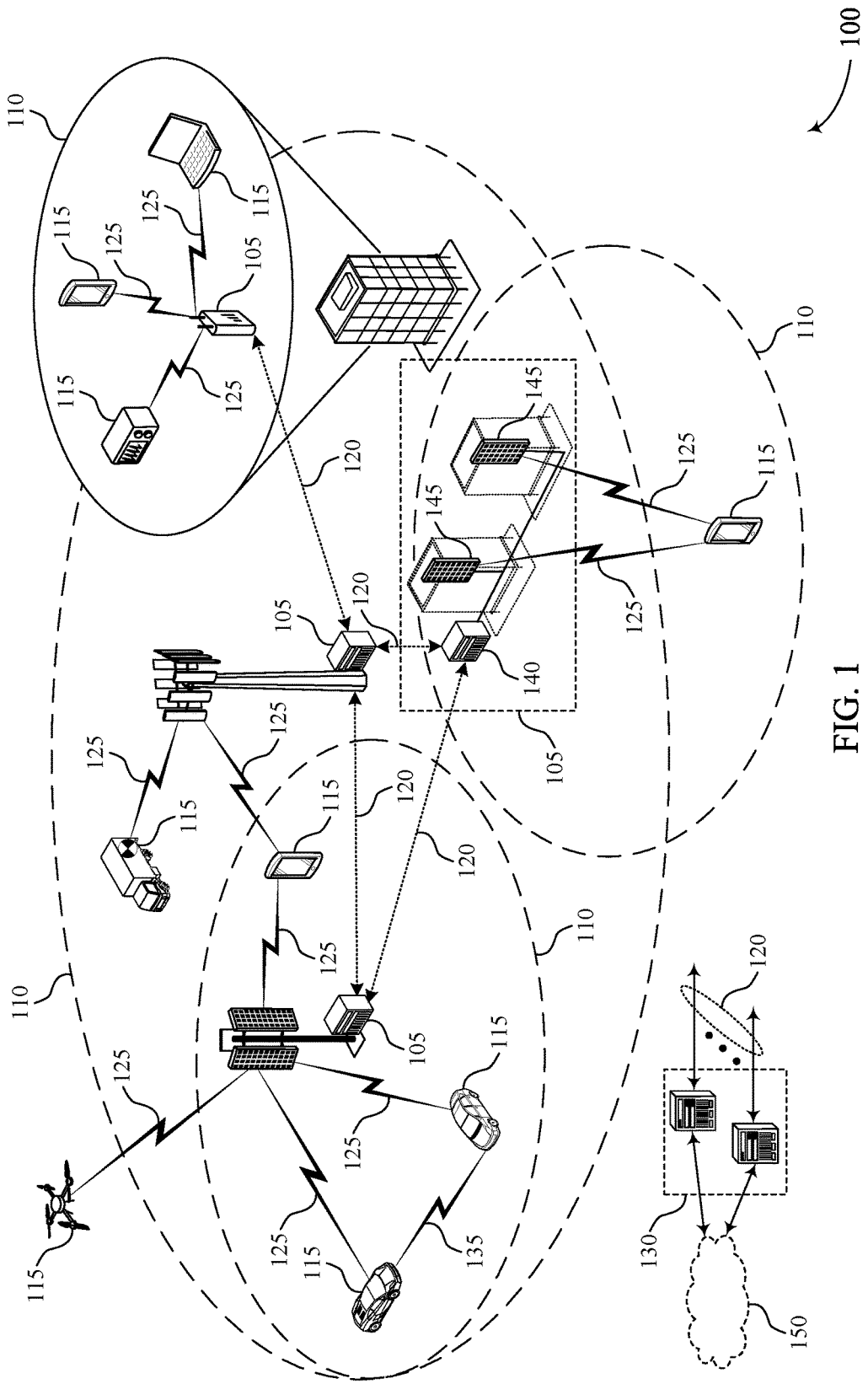
FIG. 1 illustrates an example of a system for wireless communications that supports cross-link interference measurement configuration in accordance with aspects of the present disclosure.

Some wireless communications systems may employ time division duplex (TDD) techniques where a wireless channel is used for both uplink transmissions and downlink transmissions. In some examples, a user equipment (UE) may receive control signaling (e.g., a downlink control information, radio resource control configuration, etc.) from a base station which indicates a TDD configuration. The UE may thus receive downlink transmissions during some transmission time intervals (TTIs), and may send uplink transmissions during other TTIs, in accordance with the TDD configuration. In some cases, one or more neighboring UEs may receive a same TDD configuration, such that the UE and its neighbor UEs simultaneously perform uplink communications during uplink TTIs, or downlink communications during downlink TTIs, in accordance with the TDD configuration. However, in some cases, one or more neighboring UEs may receive different TDD configurations. In such cases, a TTI (e.g., a symbol period) of a first configuration for a first UE may be configured for uplink signaling, while the same TTI (e.g., symbol period) is configured for downlink signaling in a second configuration for a second UE. If the first UE is configured for uplink transmission during a symbol period, and the second UE is configured to receive a downlink transmission during the same symbol period, and if the first and the second UE are in close proximity, the uplink transmission of the first UE may cause interference to reception of the downlink transmission at the second UE. This type of interference may be referred to as cross-link interference (CLI). In some examples, the first UE may be referred to as an aggressor UE and the second UE may be referred to as a victim UE.

To manage CLI in a wireless communications system, a victim UE may measure one or more metrics of the CLI using resources allocated by a base station to determine a strength of the CLI. During a configured CLI resource, an aggressor UE may send an uplink transmission (e.g., a sounding reference signal (SRS)) and a victim UE may measure the strength of the CLI during that resource. In some examples, a CLI measurement timing or prioritization scheme may be based on a relationship between a serving cell of the victim UE and a serving cell of an aggressor UE. For example, the aggressor UE may be in a same cell as the victim UE, in which case the measurement timing may correspond to timing of the victim UE (e.g., downlink timing or uplink timing). In some examples, the aggressor UE may be in a neighboring cell of a homogenous deployment, or in a different cell of a heterogeneous deployment. If the aggressor UE is in a different cell, then a CLI reception timing may be different than the timing of the victim UE based on a distance between the aggressor UE and the victim UE, a timing configuration of the cell of the aggressor UE, or a combination thereof. If the aggressor UE is in a different cell of a heterogeneous deployment, a base station of a first cell may or may not be co-located with a base station of a second cell. If the base station of the first cell is co-located with the base station of the second cell, then the victim UE may assume that a CLI reception timing may have a particular relationship to downlink timing of the victim UE. But if the base station of the first cell is not co-located with the base station of the second cell, then the CLI reception timing may not have a relationship to timing of the victim UE based on a distance between the aggressor UE and the victim UE, a timing configuration of the cell of the aggressor UE, or the like. Additionally, in some examples, (e.g., neighboring cells of a homogenous deployment), some UEs in a neighboring cell may not cause CLI to the victim UE unless the victim UE is located near the edge of a coverage area associated with its serving cell. Thus a UE may more efficiently make use of resources, conserve power, or the like, by refraining from performing CLI measurements with respect to those UEs unless the victim UE is located near a boundary of the coverage associated with its serving cell.

However, in some examples, the victim UE may not know the relationship between a serving cell of the victim UE and a serving cell of the aggressor UE. In such examples, the victim UE may not know one or more timing parameters to use for measuring CLI. Additionally, if the victim UE does not know the relationship between its serving cell and a serving cell of an aggressor UE, then the victim UE may not know which aggressor UEs to prioritize when measuring CLI. Such instances may, in some cases, lead to an inefficient use of measurement resources, unnecessary expenditure of power, misaligned CLI timing, poor CLI measurements, or the like. Accordingly, informing a victim UE of its relationship to aggressor UEs may facilitate efficient use of measurement resources and thereby reduce communication overhead.

Methods of informing a victim UE of its relationship to aggressor UEs are described herein. Such methods may include a base station transmitting, to a victim UE, one or more parameters indicating the relationship of the victim UE to one or more aggressor UEs. In some examples, the one or more parameters may include information indicating a serving cell of the victim UE and a serving cell of an aggressor UE. In such examples, the one or more parameters may include a cell identifier (ID) (e.g., physical cell identifier (PCID)) for the serving cell in which an aggressor UE generates CLI. The victim UE may compare its serving cell ID to the cell ID of the aggressor UE to determine whether the CLI measurement is intra-cell or inter-cell. In some examples, the one or more parameters may include a flag indicating whether the CLI measurement resource is intra-cell or inter-cell. In some cases, the one or more parameters may include information indicating whether base stations of the serving cell of the victim UE and the serving cell of the aggressor UE are co-located or not co-located. In some examples, the one or more parameters may include information indicating whether the serving cell of the victim UE and the serving cell of the aggressor UE are overlapping.

A victim UE may determine CLI measurement parameters based on receiving an indication of the relationship between its own serving cell and the serving cell of one or more aggressor UEs. For example, if information is received indicating that a CLI measurement is an intra-cell CLI measurement, the UE may determine that one or more timing parameters for the CLI measurement have a particular relationship to the victim UE's downlink timing. If the victim UE receives an indication that a CLI measurement is inter-cell, then the victim UE may perform a timing estimation to determine the one or more timing parameters of the CLI measurement. Accordingly, the victim UE may adjust one or more aspects of the CLI measurement based on the determined timing parameters. For example, the victim UE may adjust a measurement window such that the CLI measurement aligns with a timing of the aggressor UE. In some examples, if the CLI measurement is inter-cell but the base stations of the serving cells are co-located, the UE may determine that the one or more timing parameters of the CLI measurement have a particular relationship to the victim UE's downlink timing (e.g., may match a timing advance of the victim UE) even though the CLI measurement is inter-cell. Determining one or more timing parameters of the CLI measurement may enable a victim UE to perform measurements that align with a timing of an aggressor UE thereby allowing more efficient use of timing resources. In some examples, if the victim UE receives an indication that a serving cell of the victim UE is not overlapping with a serving cell of one or more aggressor UEs, the victim UE may determine that CLI measurements are required only for aggressor UEs if the victim UE is in a boundary region of its serving cell. Prioritizing CLI measurements in this way for aggressor UEs may further enable the victim UE to perform measurements on a smaller number of aggressor UEs, thereby using measurement resources more efficiently and decreasing communications overhead.

Particular aspects of the subject matter described herein may be implemented to realize one or more advantages. The described techniques may support improvements in system efficiency, power savings, and user experience. A victim UE may more efficiently take CLI measurements by adjusting a CLI measurement window when timings are misaligned by determining the relationship between serving cells. Such a UE may avoid failed or poor CLI measurements, increasing system efficiency and more effectively reducing CLI when a base station mitigates such CLI based on accurate CLI reports. Additionally, a UE may conserve power by prioritizing aggressor UEs for measuring CLI. As such, supported techniques may include improved network operations, decreased interference, improved system efficiency, longer battery life, and improved user experience.

Aspects of the disclosure are initially described in the context of wireless communications systems and process flows. Aspects of the disclosure are further illustrated by and described with reference to apparatus diagrams, system diagrams, and flowcharts that relate to cross-link interference measurement configuration.

FIG. 1 illustrates an example of a wireless communications system 100 that supports cross-link interference measurement configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may configure CLI measurement resources for measuring CLI, and a victim UE 115 may perform CLI measurements during the CLI measurement resources. However, in some cases, timing between the victim UE 115 and the aggressor UE 115 may be misaligned. In some cases, a UE 115 may conserve power and improve system efficiency by prioritizing CLI measurements based on a relationship between serving cells of the victim and aggressor UEs 115. Thus, in the configuration message that indicates the CLI measurement resources, a base station 105 may provide one or more cell parameters, which may include an indication of the relationship between the serving cells. The victim UE 115 may determine the relationship between the serving cells based on the received cell parameters, and may perform CLI measurements based thereon. In some cases, the UE 115 may adjust a CLI measurement window, or may prioritize some aggressor UEs 115, based on the determined relationship. The UE 115 may also transmit a CLI measurement report to the base station.

Figure 2:
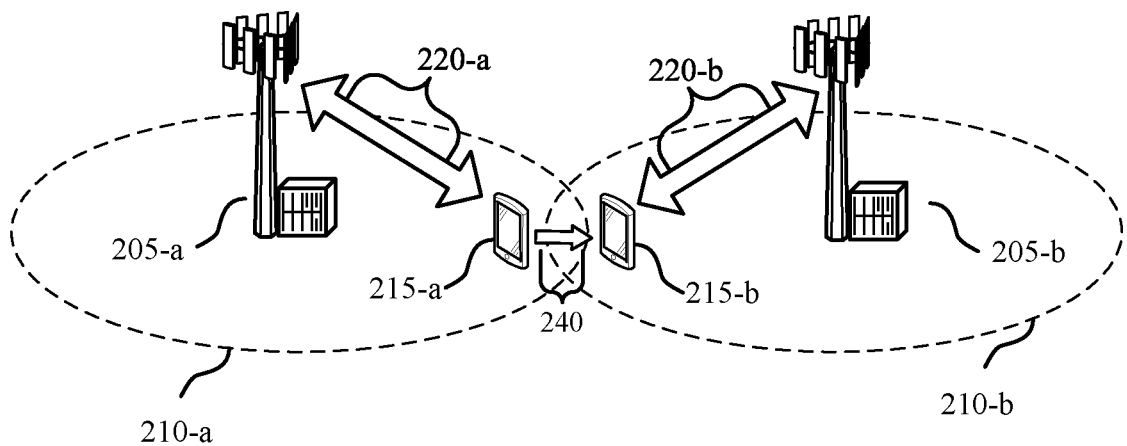
FIG. 2 illustrates an example of a wireless communications system that supports cross-link interference measurement configuration in accordance with aspects of the present disclosure.
Figure 2:
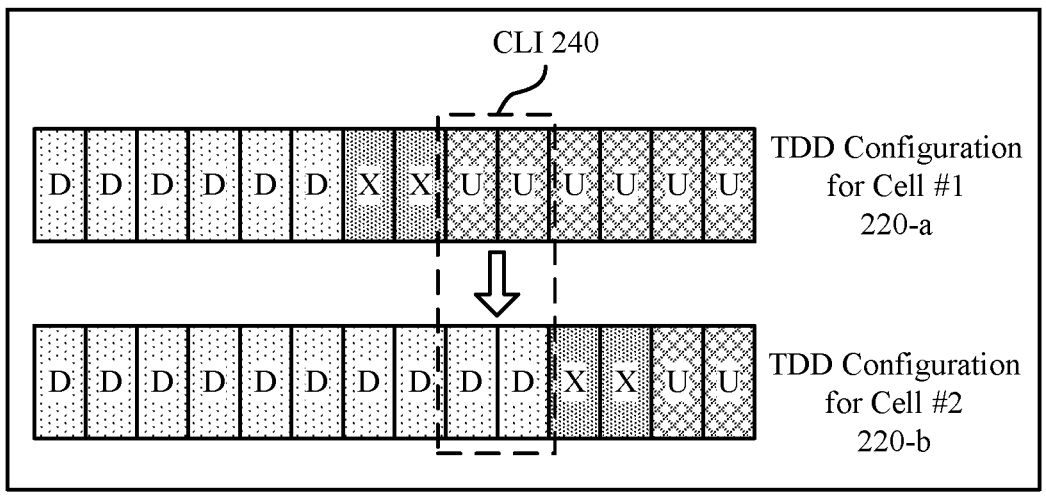
Figure 2:
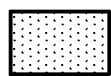
Figure 2:
Figure 2:
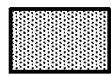

FIG. 2 illustrates an example of a wireless communications system 200 that supports cross-link interference measurement configuration in accordance with aspects of the present disclosure. In some examples, wireless communications system 200 may implement aspects of wireless communications system 100. The wireless communications system 200 may include a UE 215-a and a UE 215-b, which may be examples of a UE 215 as described herein. The wireless communications system 200 may also include a base station 205-a and a base station 205-b which may be examples of a base station 205 as described herein. The base stations 205 may each be associated with a cell which provides wireless communications with the base station 205 within a respective coverage area 210.

The wireless communications system 200 may employ TDD communications where a wireless communications channel is used for both uplink transmissions and downlink transmissions. Each cell may configure a TDD configuration 220 for the cell. For example, the first cell of base station 205-a may use a first TDD configuration 220-a, and the second cell of base station 205-b may use a second TDD configuration 220-b. UEs 215 in these cells may communicate with the base stations based on the corresponding TDD configuration 220. For example, a slot of a TDD configuration 220 may include symbol periods for downlink symbols 225, flexible symbols 230, uplink symbols 235, or any combination thereof. The base station 205 may transmit downlink signals in a downlink symbol 225, and the UE 215 may transmit uplink signals in an uplink symbol 235. Flexible symbols 230 may, in some cases, be used as guard periods between the uplink transmissions and downlink transmissions. A guard period may prevent inter-symbol interference or may provide time for a UE 215 to adjust radio frequency hardware, reconfigure antennas, or the like. In some cases, a flexible symbol 230 may be dynamically reconfigured to either a downlink symbol 225 or an uplink symbol 235.

A base stations 205 may dynamically change the TDD configurations 220. In an example, the traffic in the first cell may shift toward being more uplink-heavy so the first TDD configuration 220-a of the first cell may change to using a slot configuration which has more uplink symbol periods. In some cases, a TDD configuration 220 may be dynamically indicated to UEs in the cell by a slot format indicator (SFI) in a downlink control information (DCI) transmission. The DCI transmission conveying the SFI may be transmitted in one of the first few downlink symbols 225 of the slot. Additionally, or alternatively, the TDD configuration 220 may be semi-statically configured (e.g., included in a radio resource control configuration) by higher layer signaling.

In some cases, different TDD configurations 220 used by neighboring cells may lead to conflicting transmission directions for some symbol periods of a slot. For example, the 9th and 10th symbol periods of the slot shown may have conflicting directions for the first TDD configuration 220-a and the second TDD configuration 220-b. The TDD configuration 220-a may have uplink symbols 235 configured when the TDD configuration 220-b has downlink symbols 225 configured. Therefore, UE 215-a in the first cell may be configured to transmit an uplink transmission while UE 215-b in the second cell is configured to receive a downlink transmission. The first cell and the second cell may be neighboring cells, and UE 215-b and UE 215-a may be near each other at the edge of their respective cell. In some cases, the uplink transmission of UE 215-a may cause CLI 240 to reception of the downlink transmission at UE 215-b at the conflicting symbol periods. Generally, differing TDD configurations 220 may result in CLI 240 when an uplink symbol of one cell collides with a downlink symbol of another nearby cell. CLI 240 may occur near or between cell edge UEs of nearby cells. CLI may also occur if different UEs are configured with different TDD configurations for a same cell. The UE 215 transmitting the uplink signal (e.g., UE 215-a) may be referred to as the aggressor UE 215, and the UE 215 which is receiving the affected downlink transmission (e.g., UE 215-b) may be referred to as the victim UE 215.

To manage CLI 240 in the wireless communications system, a victim UE 215 (e.g., UE 215-b) may perform a measurement process to determine one or more metrics of the CLI 240 to determine a strength of the CLI 240. In some such processes, the victim UE 215 may notify a serving base station 205 (e.g., 205-b) of potential interference. The serving base station 205 may then configure resources for measuring one or more metrics of the CLI 240 and transmit a message to the victim UE 215-b indicating the resources. The victim UE 215 may then perform a measurement of one or more metrics of the CLI 240. For example, the one or more metrics may include a reference signal receive power (RSRP), a received signal strength indicator (RSSI), a signal-to-interference-plus-noise (SINR), or similar power measurements in order to determine how much CLI 240 is affecting the victim UE 215. In some cases, the RSRP and RSSI measurement may be performed on respective reference signals transmitted by the aggressor UE 215 (e.g., UE 215-a) for measuring CLI 240. Such reference signals may include sounding reference signals (SRSs), CLI reference signals (CLI-RSs), or the like. For example, the aggressor UE 215 may transmit a first set of CLI reference signals (CLI-RSs) to enable a victim UE 215 to measure an RSRP on the CLI-RSs for determining the strength of CLI 240, a second set of CLI-RSs to enable the victim UE 215 to measure an RSSI on the CLI-RSs (e.g., CLI-RSs for RSSI) for determining the strength of CLI 240, or any combination thereof.

In some cases, the CLI-RSs may be existing reference signals that a victim UE 215 measures to determine different metrics about the CLI 240. For example, the CLI-RSs may include SRSs, channel state information reference signals (CSI-RSs), or similar uplink signals that an aggressor wireless device transmits during one or more corresponding downlink symbols at the victim UE 215. Accordingly, the victim UE 215 may measure a strength of the CLI 240 based on one or more CLI-RSs received from the aggressor wireless device. After determining the strength of the CLI 240, the victim UE 215 may report the CLI measurement to the serving base station 205. The serving base station 205 may then initiate a CLI management procedure whereby the CLI 240 is eliminated or otherwise considered.

In some examples, a base station 205 may configure one or more CSI measurement resources for each aggressor UE 215. For instance, in a case where there are two potential aggressor UEs 215, a base station may configure a first set of one or more CSI measurement resources for measuring CLI from the first aggressor UE 215, and may configure a second set of one or more CSI measurement resources for measuring CLI from the second aggressor UE 215. Alternatively, a set of CSI measurement resources may be configured for multiple configured aggressor UEs 215.

While it is shown in FIG. 2 that each UE 215-a and UE 215-b are connected to a first and second cell with corresponding base stations 205-a and 205-b, respectively, different scenarios may exist where uplink transmissions from UE 215-a may cause CLI on downlink transmissions received by UE 215-b. The various techniques described herein may also be applied for other UE to base station connection topologies. For example, the victim UE 215 may not know whether an aggressor UE 215 is in a same cell, a neighboring cell of a homogenous deployment, or in a different cell of an overlapping or heterogeneous deployment. If the aggressor UE 215 is in a different cell of a heterogeneous deployment, the base stations 205 associated with the cells may or may not be co-located. In some cases, the victim UE may not know the UE to base station connection topology (e.g., the relationship between a serving cell of the victim UE and a serving cell of an aggressor UE). In such cases, the victim UE may not know one or more timing parameters to use for measuring CLI 240. Such timing misalignment between serving cells may result in poor or failed CLI measurements, inefficient use of resources, and decreased system efficiency. Additionally, the victim UE 215 may not know which aggressor UEs 215 to prioritize when measuring CLI. Such instances may, in some cases, lead to an inefficient use of measurement resources, excessive power expenditures, or the like. Such alternative connection topologies and challenges introduced thereby are further described with reference to FIGS. 3A-3D. To address such challenges, a base station 205 may provide information regarding the relationship between serving cells to a victim UE 215, as described in greater detail with reference to FIG. 5.

FIG. 3A-3D illustrates examples of a wireless communications systems 300-303 which may be examples of a wireless communications systems 100 and 200, and may support cross link interference measurement configuration in accordance with aspects of the present disclosure. In some examples, a wireless communications system 300 through 303 may implement aspects of wireless communications systems 100 or 200. Wireless communications systems 300 through 303 may include UEs 315 which may be examples of UEs 115 and 215. Wireless communications systems 300 through 303 may also include one or more base stations 305 which may be examples of a base station 105 or 205. The one or more base stations 305 may each be associated with a cell which provides communications with the one or more base stations 305 with a respective coverage areas 310. In some examples, the wireless communications systems 300 through 303 may represent UE to base station connection topologies as described with reference to FIG. 2.

With reference to FIG. 3A, a UE 315-a and a UE 315-b may be operating within a same serving cell and may both be in communication with a base station 305-a. In such examples, if the UE 315-a is transmitting uplink signals when the UE 315-b is transmitting downlink signals, then the UE 315-a may interfere with the UE 315-b, creating CLI. In these examples, the UE 315-a may be referred to as an aggressor UE and the UE 315-b may be referred to as a victim UE. In some cases, the victim UE 315-b may perform a measurement of the CLI created by aggressor UE 315-a. Such a measurement may, in some cases, be referred to as an intra-cell CLI measurements. In some examples, one or more timing parameters associated with the CLI measurement may correspond with a timing of the victim UE 315-b.

With reference to FIG. 3B, a UE 315-c and a UE 315-d may be operating within different cells and in communication with a base station 305-b and a base station 305-c, respectively. In some examples, the serving cell of UE 315-c and the serving cell of UE 315-d may be neighboring cells of a homogeneous deployment (e.g., a same type of cell). In such examples, if the UE 315-c is transmitting uplink signals when the UE 315-d is receiving downlink signals, then the UE 315-c may interfere with the UE 315-d, creating CLI. In these examples, the UE 315-c may be referred to as an aggressor UE and the UE 315-*d* may be referred to as a victim UE. In some cases, the victim UE 315-*b* may perform a measurement of CLI created by the aggressor UE 315-*c*. Such a measurement may, in some cases, be referred to as an inter-cell CLI measurement. In some examples, one or more timing parameters associated with the CLI measurement may be different from a timing of the victim UE 315-*d*.

In another example, and with reference to FIG. 3C, a UE 315-*e* and a UE 315-*f* may be operating within different cells and in communication with a base station 305-*d* and a base station 305-*e*, respectively. A UE to base station connection topology such as the one shown in FIG. 3C may be referred to as inter-cell as described with reference to FIG. 3B and may implement aspects of wireless communication system 300-*b*. In some examples, the UE 315-*e* may be an example of an aggressor UE and the UE 315-*f* may be an example of a victim UE as described with reference to FIG. 3B. In such examples, the serving cell of the aggressor UE 315-*e* and the serving cell of the victim UE 315-*f* may be different cells of a heterogenous deployment (e.g., different cell types). In some examples, the base station 305-*d* and the base station 305-*e* may not be co-located (e.g., may be geographically separated). In such examples, if the victim UE 315-*f* performs a measurement of CLI created by the aggressor UE 315-*e*, one or more timing parameters associated with the measurement may be different from a timing of the victim UE 315-*f*.

In another example, and with reference to FIG. 3D, wireless communication system 300-*d* may be an example of an inter-cell, heterogenous deployment as described with reference to FIG. 3C. In some examples, the UE 315-*g* may be an example of an aggressor UE and the UE 315-*h* may be an example of a victim UE as described with reference to FIG. 3B. In some examples, a base station 305-*f* associated with a serving cell of an aggressor UE 315-*g* and a base station 305-*g* associated with a serving cell of a victim UE 315-*h* may be co-located (e.g., not geographically separated, or within a threshold distance of one another). In such examples, if the victim UE 315-*h* performs a measurement of CLI created by an aggressor UE 315-*g*, one or more timing parameters associated with the measurement may correspond to a timing of the victim UE 315-*f*.

In some examples, a base station 305 may transmit one or more cell parameters to a UE 315. The cell parameters may provide information regarding a relationship between a first serving cell and a second serving cell. For instance, a cell identity indicator may indicate to a UE 315 whether it is to perform intra-cell CLI measurement as shown in FIG. 3A or inter-cell CLI measurement as shown in FIG. 3B. A cell location indicator may indicate to a UE 315 whether base stations are co-located as shown in FIG. 3D or not co-located as shown in FIG. 3C. A cell overlap indicator may indicate to a UE 315 whether the second serving cell is substantially overlapping with the first serving cell as shown in FIG. 3C, or not substantially overlapping as shown in FIG. 3B. One or more of these cell parameters may provide a UE 315 with information about whether and how to adjust or prioritize CLI measurements, as described in greater detail with reference to FIG. 5.

Figure 4:
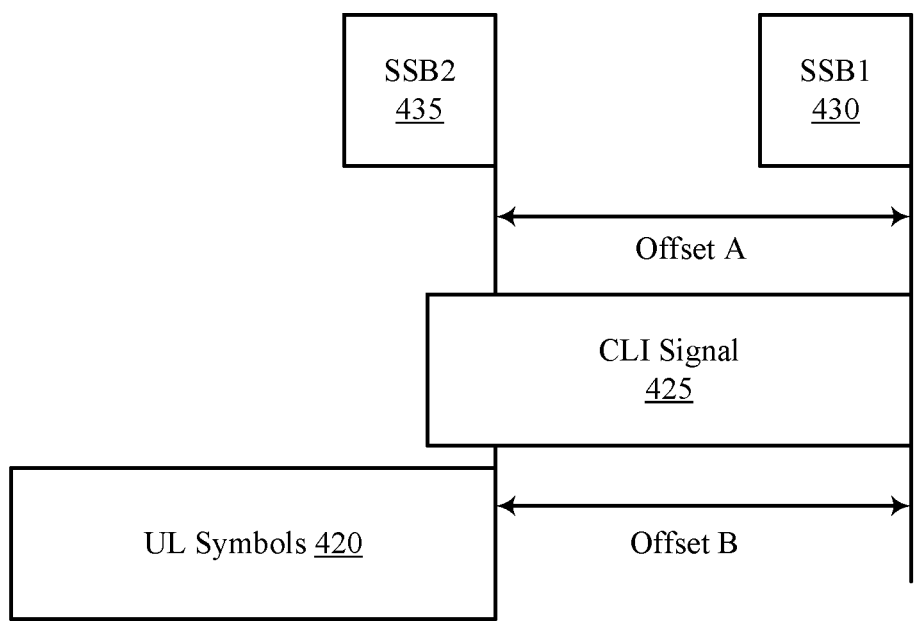
FIG. 4 illustrates an example of a wireless communications system that supports cross-link interference measurement configuration in accordance with aspects of the present disclosure.
Figure 4:
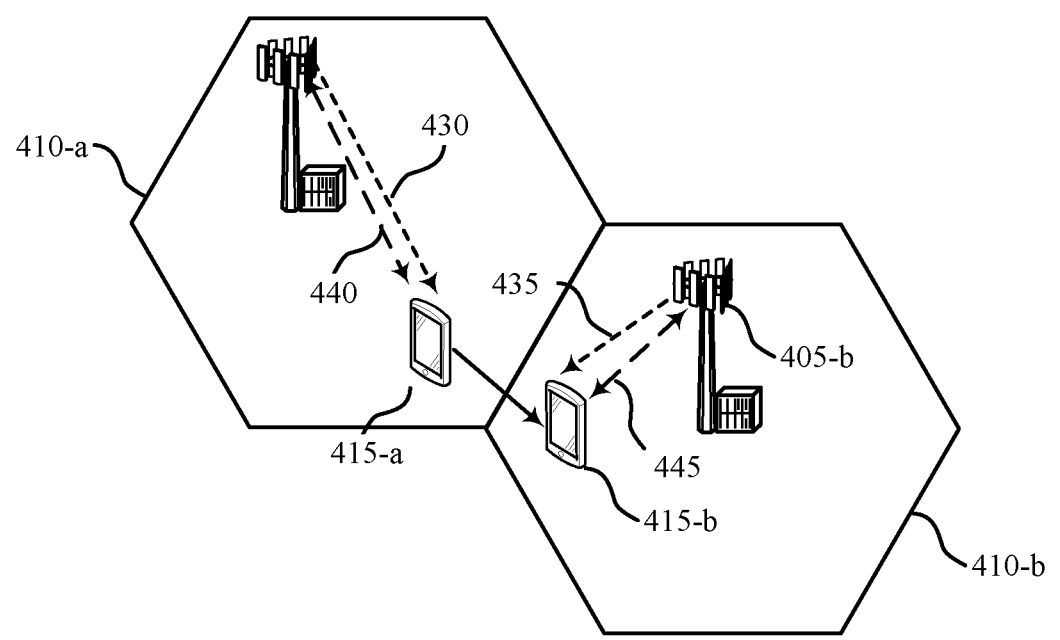

FIG. 4 illustrates an example of a wireless communications system 400 that supports cross-link interference measurement configuration in accordance with aspects of the present disclosure. In some examples, wireless communications system 400 may implement aspects of wireless communication systems 100, 200, and 300-303. UE 415-*a* and UE 415-*b* may be examples of corresponding devices described with reference to wireless communication systems 100, 200, and 300-303. Similarly, base station 405-*a* and base station 405-*b* may be examples of corresponding devices described with reference to wireless communication systems 100, 200, and 300-303.

In some examples, a UE 415 may perform CLI measurements, as described in greater detail with reference to FIG. 5. However, in some cases (e.g., neighbor cells in a homogeneous deployment, or for different cells where base stations 405 are not co-located), the timing for a victim UE and a timing for an aggressor UE may not be aligned. For instance, base station 405-*a* may communicate with UE 415-*a* over bidirectional communication link 440 in a first cell associated with coverage area 410-*a*. UE 415-*a* may use a first timing associated with bidirectional communication link 440. Second base station 405-*b* may communicate with UE 415-*b* over bidirectional communication link 445 in a second cell associated with coverage area 410-*b*. UE 415-*b* may use a second timing associated with bidirectional communication link 445. UE 415-*a* may generate CLI for UE 415-*b*, as described in greater detail with reference to FIG. 2. In such cases, timing misalignment may be addressed in one of the following ways.

In some examples, UE 415-*a* may not make any change to its transmission timing when transmitting CLI signals for CLI measurement by UE 415-*b*. In such examples, UE 415-*b* may apply a timing advance (TA) value to the corresponding uplink symbols on which a CLI reference signal (e.g., an SRS) is measured. The TA value may be equal to a TA value used or other uplink symbols transmitted to base station 405-*b*.

In some examples, UE 415-*b* may perform CLI measurements including SRS-RSRP, CLI RSSI, or the like. The receive timing for such reception may be left to UE implementation within OFDM symbols configured for CLI measurement. Thus, UE 415-*b* may adjust its own CLI measurement window, as described with reference to FIG. 5.

In some examples. UE 415-*b* may ignore aggressor UE to victim UE delay. In such examples, UE 415-*b* may assume that UE 415-*a* and UE 415-*b* have the same timing (e.g., the same base station to UE delay). In such examples, UE 415-*b* may use its most recent uplink timing to measure CLI from UE 415-*a*. In some examples, UE 415-*b* may obtain a difference between its own uplink timing and the uplink timing of UE 415-*a*, and may use this timing difference as a timing offset. In such examples UE 415-*b* may adjust its CLI measurement window by the determining timing difference. For instance, base station 405-*a* may transmit a system synchronization block (SSB) 430 having a first timing and base station 405-*b* may transmit a SSB 435 having a second timing. UE 415-*a* may determine offset A between SSB 430 and SSB 435 (e.g., by subtracting timing for SSB 435 from timing for SSB 430). UE 415-*b* may determine offset B between the transmission of CLI signal 425 and uplink symbols 420 for receiving the CLI signal (e.g., by setting Offset B equal to Offset A). In some examples, UE 415-*b* may adjust its CLI measurement window (e.g., within a set of configured CLI measurement resources) by offset B to measure at least a portion (e.g., an overlapping portion between CLI signal 425 and UL symbols 420) of the CLI signal 425.

UE 415-*b* may determine when to adjust its timing measurement window, or when to prioritize some aggressor UEs 415 over other aggressor UEs 415, based on one or more cell parameters indicated by a serving base station 405, as described in greater detail with reference to FIG. 5.

Figure 5:
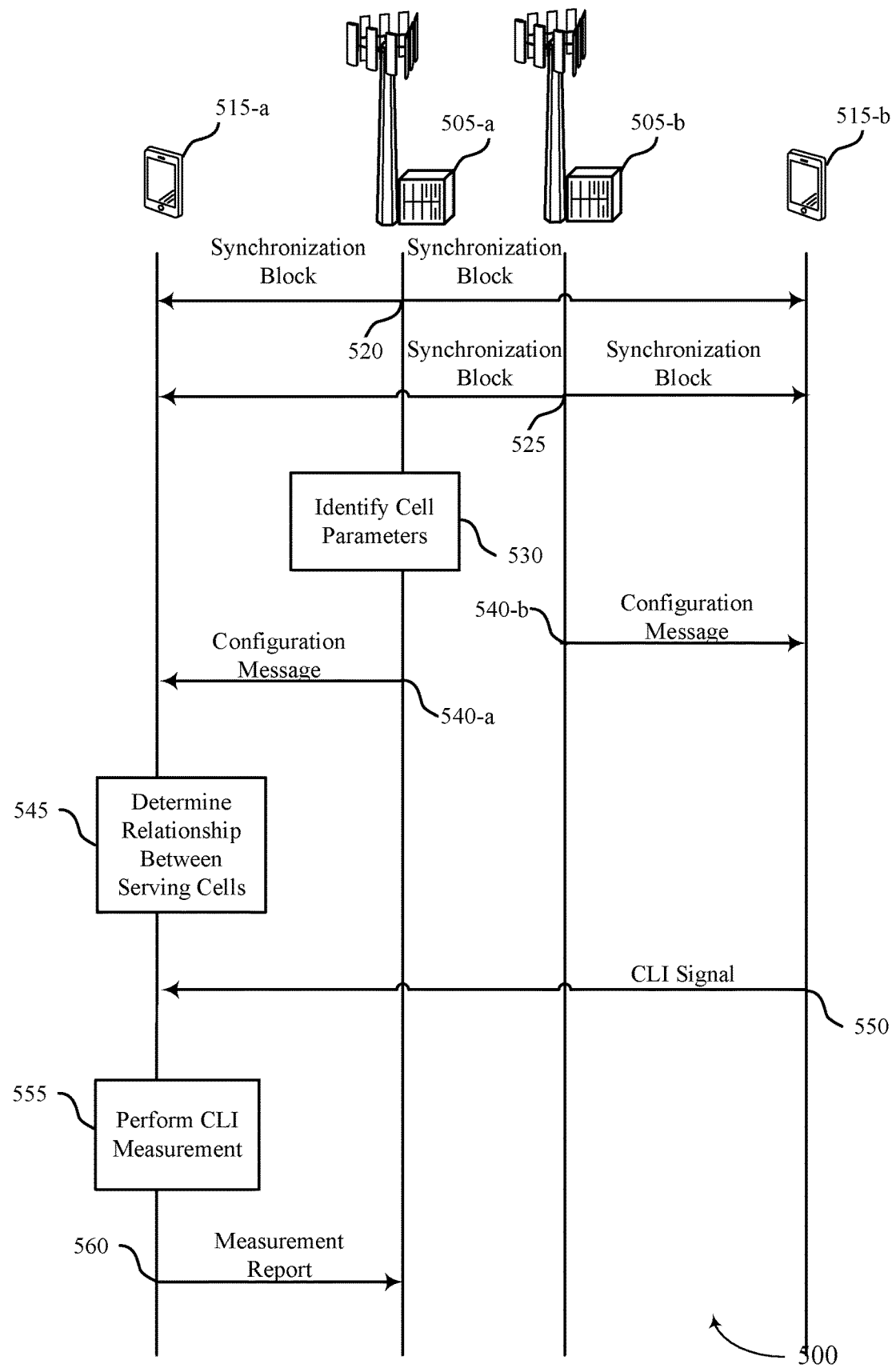
FIG. 5 illustrates an example of a process flow that supports cross-link interference measurement configuration in accordance with aspects of the present disclosure.

FIG. 5 illustrates an example of a process flow 500 that supports cross-link interference measurement configuration in accordance with aspects of the present disclosure. In some examples, process flow 500 may implement aspects of wireless communication systems 100, 200, 300, and 400. UE 515-*a* and UE 515-*b* may be examples of corresponding devices described with reference to wireless communication systems 100, 200, 300-303, and 400. Base station 505-*a* and base station 505-*b* may be examples of corresponding devices described with reference to wireless communication systems 100, 200, 300-303, and 400. One or more additional UEs 515 (e.g., including UE 515-*b*), may cause CLI for UE 515-*a* (e.g., a victim UE).

Base station 505-*a* may serve one or more UEs 515-*a* in a first serving cell. Base station 505-*b* may serve one or more UEs 515-*b* in a second serving cell. In some examples, at 520, base station 505-*a* may transmit a synchronization block. For instance, base station 505-*a* may transmit a SSB, via a broadcast channel (e.g., a synchronization signal/ physical broadcast channel (SS/PBCH). In some examples (e.g., if the first serving cell and the second serving cell partially or completely overlap, if the first serving cell and the second serving cell are neighboring cells or the like), both UE 505-*a* and UE 505-*b* may receive the synchronization block transmitted by base station 505-*a* at 520. At 525, base station 505-*b* may also transmit a synchronization block (e.g., an SSB via an SS/PBCH). Both UE 515-*a* and UE 515-*b* may receive the synchronization block transmitted by base station 505-*b* at 525.

At 530, base station 505-*a* may determine one or more cell parameters. For example, base station 505-*a* may identity one or more cell identity indicators (e.g., indicating that CLI caused by UE 515-*b* is inter-cell or intra-cell), one or more cell location indicators (e.g., indicating whether base station 505-*a* and base station 505-*b* are co-located), one or more cell overlap indicators (e.g., indicating whether the first cell and the second cell overlap), or a combination thereof.

At 540-*a*, base station 505-*a* may transmit a configuration message to UE 515-*a*. The configuration message may include an indication of the one or more cell parameters, an indication of one or more resources for performing CLI measurements, or both. The configuration message may be higher layer signaling (e.g., RRC signaling). The indications may be included, for example, in an information element of the RRC message. In some examples, the one or more resources for measuring CLI may include multiple resources for multiple potential aggressor UEs 515. For example, a first set of one or more resources may correspond to a first UE 515-*b*, and another set of one or more resources may correspond to a second UE 515 (not shown). In some examples, each CLI measurement resource may correspond to a subset of all potential aggressor UEs 515 (e.g., a first CLI measurement resource may correspond to a first set of one or more potential UEs 515, a second CLI measurement resource may correspond to a second set of one or more potential UEs 515, etc.).

At 540-*b*, base station 505-*b* may transmit a configuration message to UE 515-*b*. The configuration message may be, for example, an RRC message. The configuration message may include a TDD configuration, as described with reference to FIG. 2. UE 515-*b* may be unaware of the CLI generated by its uplink transmissions to 505-*b*. However, the one or more CLI measurement resources indicated by the configuration message transmitted at 540-*a* may align with one or more uplink TTIs (e.g., uplink symbols) in the TDD configuration indicated by the configuration message 540-*b*. For example, the CLI measurement resources may align with previously scheduled reference signal transmissions by 515-*b* (e.g., SRS transmissions, CSI-RS transmissions, CLI-RS transmissions, or the like). Thus, UE 515-*a* may measure CLI from UE 515-*b* during the configured CLI measurement resources. In some examples, base station 505-*a* may indicate, in the configuration message transmitted at 540-*b*, one or more CLI resources over which UE 515-*b* is to send a reference signal. That is, base station 505-*b* may specifically indicate, in the configuration message configured at 540-*b*, one or more resources over which UE 515-*b* is instructed to transmit reference signals for the purpose of CLI measurement by 515-*a*.

At 545, UE 515-*a* may determine a relationship between the first serving cell and the second serving cell. For example, the relationship between the first serving cell and the second serving cell may be based on cell identities. That is, the first cell and the second cell may be the same cell (e.g., intra-cell CLI), or may be different cells (e.g., inter-cell CLI). The relationship between the first serving cell and the second serving cell may be based on cell location. That is, base station 505-*a* and base station 55-*b* may be co-located, or may not be co-located. The relationship between the first serving cell and the second serving cell may be based on cell overlap. That is, the first serving cell and the second serving cell may partially or completely overlap or may not substantially overlap.

UE 515-*a* may determine the relationship based on the one or more cell parameters received at 540-*a*. The configuration message received by UE 515-*a* at 540-*a* may include one or more cell identity indicators. The cell identity indicators may include a flag (e.g., one-bit indicator), where a first value of the flag indicates a first relationship between the first serving cell and the second serving cell, and a second value of the flag indicates a second relationship between the first serving cell and the second serving cell. In some examples the first value may indicate intra-cell CLI where the first cell and the second cell are the same. That is, UE 515-*a* may be experience CLI from another UE also served by base station 505-*a* via the same serving cell, as described with reference to FIG. 3A. A second value may indicate inter-cell CLI, where the first cell and the second cell are not the same, as described with reference to FIG. 3B. The cell identity indicator may include a cell ID for the second serving cell associated with base station 505-*b*. In such examples, UE 515-*a* may determine the relationship between the serving cells by determining whether the cell identifier for the first serving cell is the same as the cell identifier for the second serving cell. For instance, UE 515-*a* may compare the cell identifier received in the configuration message at 540-*a* with its own cell identifier (e.g., received previously). If the two cell identifiers are the same, then UE 115-*a* may determine that it is experiencing intra-cell CLI, and may perform CLI measurements at 555 using its own timing based on the determination. If the two cell identifiers are not the same, then UE 515-*a* may determine that it is experiencing inter-cell CLI, and may adjust its CLI measurement window when performing CLI measurements at 555 based on the determination.

In some examples, the configuration message received by UE 515-*a* at 540-*a* may include a cell location indicator. The cell location indicator may indicate whether the first cell and the second cell (e.g., base station 505-*a* and base station 505-*b*) are co-located. For instance, in a heterogeneous deployment, base station 505-*a* and base station 505-*b* may be co-located (e.g., physically located at the same or nearly the same location) as described with reference to FIG. 3D, or may not be co-located as described with reference to FIG. 3C. If base station 505-*a* and base station 505-*b* are co-located, then UE 515-*a* may perform CLI measurements at 555 based on its own timing. If base station 505-*a* and base station 505-*b* are not co-located, then UE 515-*a* may adjust its CLI measurement window when performing CLI measurements at 555 based on the determination.

In some examples, the configuration message received by UE 515-*a* at 540-*a* may include a cell overlap indicator. UE 515-*a* may determine, based on the cell overlap indicator, whether an overlap between a first coverage area associated with the first serving cell and a second coverage area associated with the second serving cell satisfies a threshold. For example, if more than a predetermined or configured percentage of the second serving coverage area is located within the first coverage area, the serving cells may be considered to be overlapping. In some examples, if the center of the second coverage area, or if the base station 505-*b* of the second serving cell are located within the first coverage area, then the serving cells may be considered to be overlapping. If the serving cells are overlapping, UE 515-*a* may determine that the aggressor UE 515-*b* may cause CLI throughout the coverage area of the first serving cell. However, if the cells are not overlapping (e.g., the overlap does not satisfy the threshold), then UE 515-*a* may determine that the aggressor UE 515-*b* may only cause CLI when the victim UE 515-*a* is near a cell edge. Because aggressor UEs 515 may only generate CLI if UE 515-*a* is located at or within a threshold distance from a neighboring border of the neighboring coverage areas of non-overlapping cells, UE 515-*a* may prioritize from which UEs 515 to measure CLI at 555.

At 550, UE 515-*b* may transmit a CLI signal, as configured by base station 505-*b* at 540-*b*. The CLI signal may be a reference signal, as described herein. UE 515-*b* may transmit the CLI signal over the one or more CLI measurement resources indicated by base station 505-*a* at 540-*a*.

At 555, UE 515-*b* may perform one or more CLI measurements over at least a portion of the CLI measurement resources based on the relationship between serving cells determined at 545.

For example, if UE 515-*a* determines that it is experiencing intra-cell CLI, it may assume that the timing of the CLI is referenced to the downlink timing for UE 515-*a*. That is, if UE 515-*a* is located close enough to an aggressor UE 515 within the first serving cell to experience CLI, and if both UE 515-*a* and the intra-cell aggressor UE 515 are being served by the same base station 505-*a*, then UE 515-*a* may assume that propagation distance between the UE 515-*a* and the aggressor UE 515 is small and that propagation delay is negligible. Thus, UE 515-*a* may use its own downlink timing or uplink timing (e.g., its own timing advance) to receive the CLI signal transmitted at 550, and may perform CLI measurements without adjusting its timing, obtaining any additional timing, or adjusting its measurement window.

If UE 515-*a* determines that it is experiencing inter-cell CLI (e.g., based on a cell identity indicator), then UE 515-*a* may recover a receive timing for the aggressor UE 515-*b*. For example, if the first cell and the second cell are different, UE 515-*a* may use a dedicated timing estimator to recover the receive timing of UE 515-*b*. That is, UE 515-*a* may determine that its own downlink timing is different than the uplink timing of UE 515-*b*, by a timing offset. In some examples, as described in greater detail with reference to FIG. 4, UE 515-*a* may determine a timing difference between the synchronization block transmitted by base station 505-*a* at 520, and the synchronization block transmitted by base station 505-*b* at 525 (e.g., the timing offset). UE 515-*a* may adjust its CLI measurement window based on the determined offset (e.g., the timing difference between synchronization blocks), and may perform the CLI measurements during the updated CLI measurement window.

If UE 515-*a* determines that it is operating in an inter-cell deployment where base station 505-*a* and base station 505-*b* are co-located, then UE 515-*a* may determine that the CLI timing is referenced to its own downlink timing. That is, if UE 515-*a* is located close enough to an UE 515-*b* to experience CLI, and if base station 505-*a* and base station 505-*b* are co-located (e.g., are located at the same location, are part of the same physical structure, etc.), then UE 515-*a* may assume that propagation distance between the UE 515-*a* and the UE 515-*b* is small and that propagation delay is negligible. Thus, UE 515-*a* may use its own downlink timing or uplink timing to receive the CLI signal transmitted at 550, and may perform CLI measurements without adjusting its timing, obtaining any additional timing, or adjusting its measurement window.

If UE 515-*a* determines that it is operating in an inter-cell deployment where base station 505-*a* and base station 505-*b* are not co-located, then UE 515-*a* may recover a receive timing for the aggressor UE 515-*b*. For example, if base station 505-*a* and base station 505-*b* are not co-located, UE 515-*a* may use a dedicated timing estimator to recover the receive timing of UE 515-*b*. That is, UE 515-*a* may determine that its own downlink timing is different than the uplink timing of UE 515-*b*, by a timing offset. In some examples, as described in greater detail with reference to FIG. 4, UE 515-*a* may determine a timing difference between the synchronization block transmitted by base station 505-*a* at 520, and the synchronization block transmitted by base station 505-*b* at 525 (e.g., the timing offset). UE 515-*a* may adjust its CLI measurement window based on the determined offset (e.g., the timing difference between synchronization blocks), and may perform the CLI measurements during the updated CLI measurement window.

If UE 515-*a* determines that the first serving cell and the second serving cell overlap (e.g., based on a cell overlap indicator), then UE 515-*a* may perform CLI measurements for all indicated aggressor UEs 515 over all configured CLI measurement resources.

If UE 515-*a* determines that the first serving cell and the second serving cell do not overlap (e.g., based on a cell overlap indicator), then UE 515-*a* may only measure CLI from aggressor UEs in other cells if UE 515-*a* is located near the boundary of the first coverage area associated with the first serving cell. If UE 515-*a* is not located near the boundary of the first coverage area, then it may not experience CLI generated by one or more UEs 515-*a* located in the second coverage area. However, UE 515-*a* may also experience CLI from one or more aggressor UEs 515 located within the first coverage area. Thus, if UE 515-*a* is located away from the boundary of the first coverage area, then UE 515-*a* may only measure CLI from the aggressor UEs 515 located within the first coverage area, and may refrain from measuring CLI from UE 515-*b* located in the second coverage area. However, if UE 515-*a* is located near the boundary of the first coverage area, then it may perform CLI measurements for aggressor UEs 515 located in the first coverage area and UE 515-*b* located in the second coverage area. UE 515-*a* may conserve power and computational resources, resulting in increased battery life and increased efficiency, by refraining from performing measurements. In some examples, refraining from performing measurements for some UEs 515 located in another coverage area may include refraining from taking measurements during CLI measurement resources associated with the UEs 515 located in other coverage areas, and refraining from reporting CLI for those UEs 515. For instance, a first set of UEs located in the first coverage area may be associated with a first set of one or more CLI measurement resources and a second set of UEs 515 including UE 515-*b* located in the second coverage area may be associated with a second set of one or more CLI measurement resources. In such examples, if UE 515-*a* is located away from the boundary of the coverage areas, then UE 515-*a* many perform CLI measurements using the first set of CLI measurement resources, but may refrain from performing CLI measurements using the second set of CLI measurement resources.

In some examples, the configuration message may include one of the cell parameters described herein. In some examples, the configuration message may include a combination of the cell parameters. UE 515-*a* may take one or multiple actions described herein. For instance, UE 515-*a* may determine, based on the configuration message received at 540-*a*, that it is located near the edge of the coverage area of its serving cell. UE 515-*a* may further determine that there are multiple aggressor UEs 515 located within the first coverage area, as well as aggressor UEs 515 located in the second coverage area. Based on this information, UE 515-*a* may determine to take measurements for all indicated UEs, and may adjust its CLI measurement window for measuring UEs 515-*b* in the second coverage area but may maintain its CLI measurement window without adjustment during other CLI measurement resources to take CLI measurements for the UEs located within the first coverage area. That is, UE 515-*a* may perform the various actions described herein (e.g., at 545) individually on a per-CLI measurement basis, or may simultaneously perform multiple actions to take multiple CLI measurements in different manners.

At 560, having performed one or more CLI measurements at 555, UE 515-*a* may transmit a CLI measurement report to base station 505-*a*. Base station 505-*a* may receive the CLI measurement report and may utilize the information therein to perform CLI mitigation (e.g., by rescheduling subsequent transmissions to reduce interference, performing a handover procedure, or the like).

Figure 6:
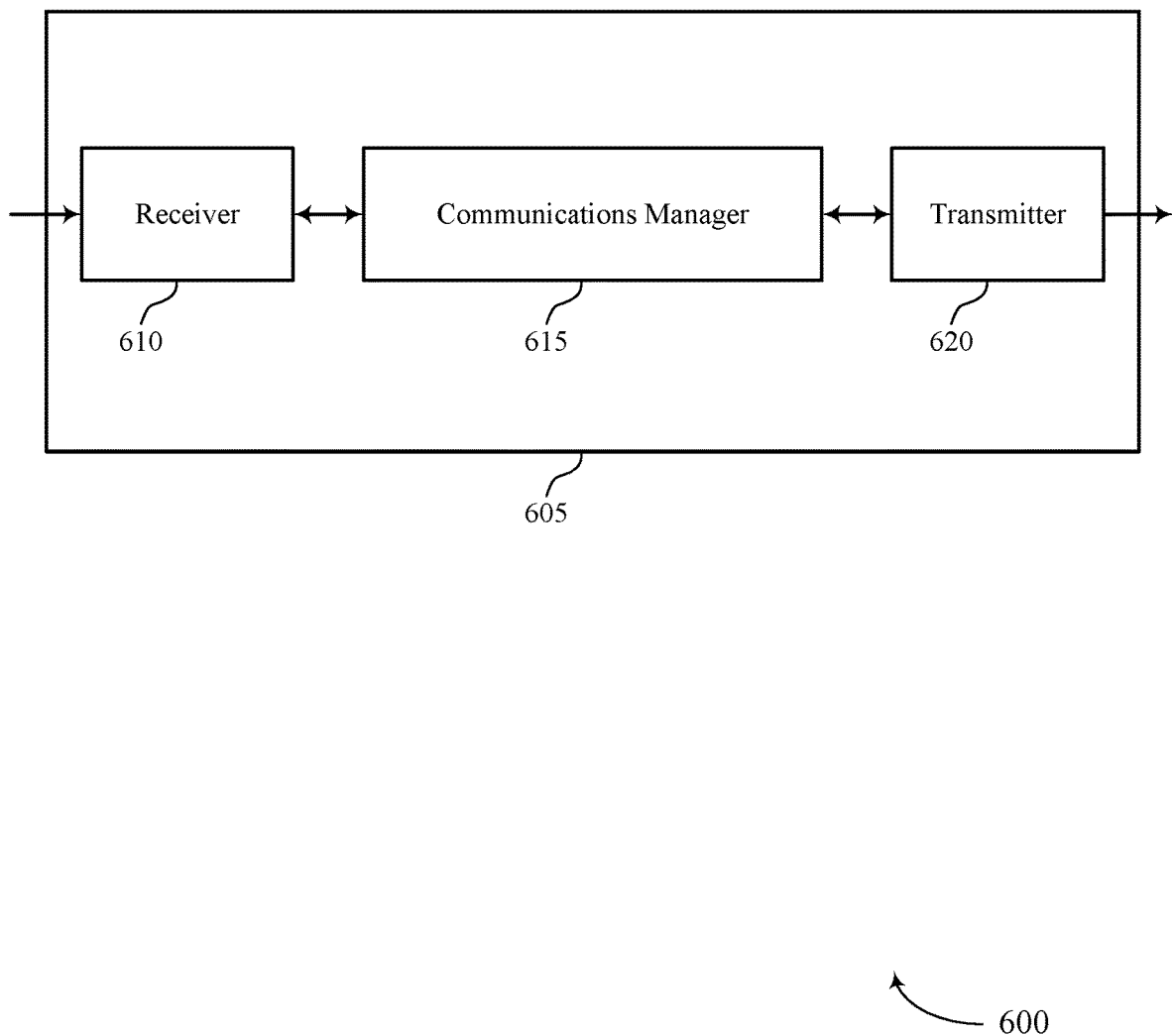
FIGS. 6 and 7 show block diagrams of devices that support cross-link interference measurement configuration in accordance with aspects of the present disclosure.

FIG. 6 shows a block diagram 600 of a device 605 that supports cross-link interference measurement configuration in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to cross-link interference measurement configuration, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a configuration message including an indication of one or more resources for performing cross-link interference measurements of additional UEs, where the configuration message includes one or more cell parameters associated with the one or more of the additional UEs, determine, based on the one or more cell parameters, a relationship between a first serving cell associated with the first UE and a second serving cell associated with a second UE of the one or more of the additional UEs, and perform a cross-link interference measurement for the second UE during at least a portion of the one or more resources, based on the determined relationship. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device to conserve power, improve CLI measurements, decrease interference, improve system efficiency, efficiently utilize computation resources, and improve user experience.

Figure 7:
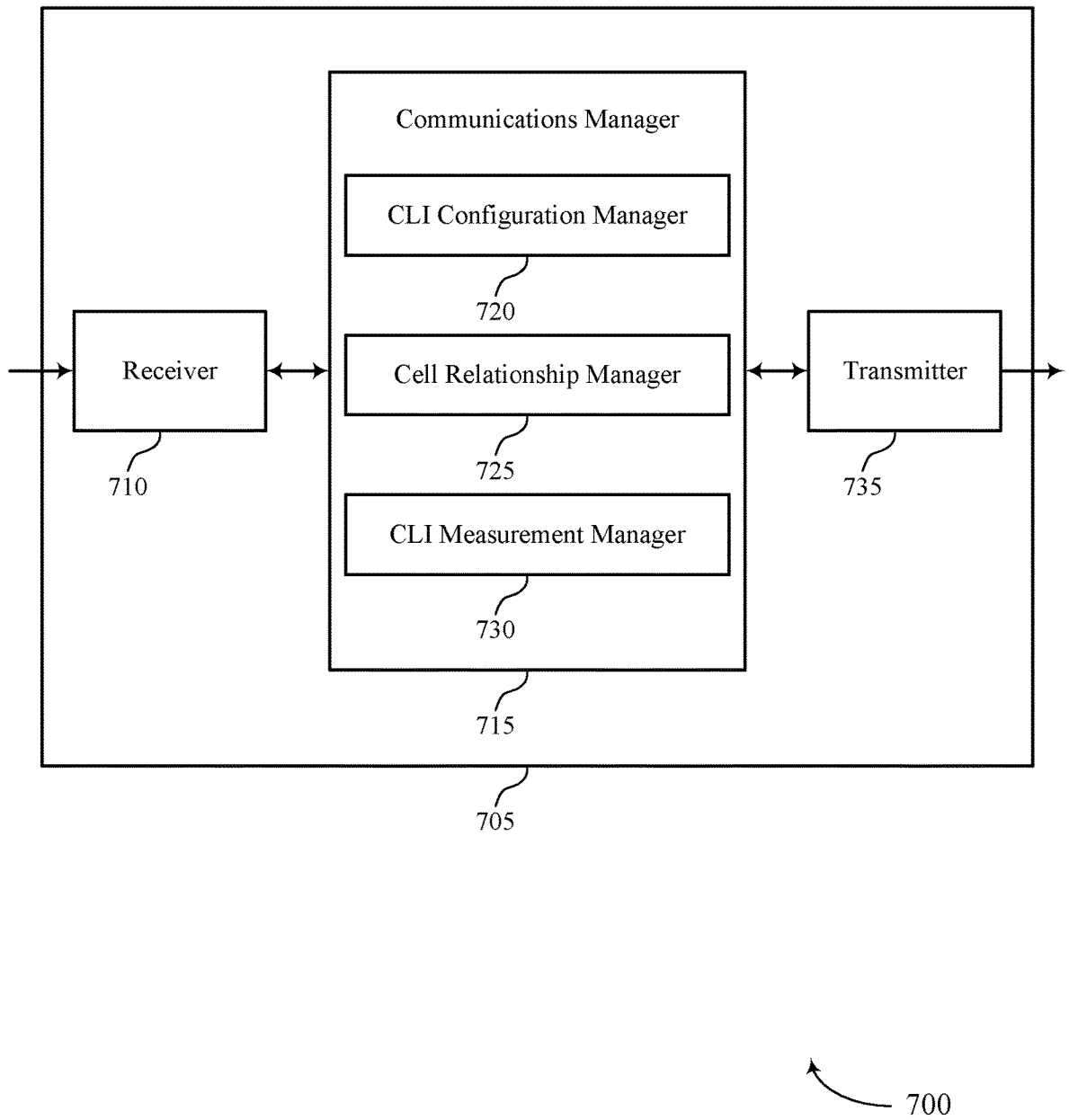

Based on techniques for efficiently communicating maximum number of layers for a device as described herein, a processor of a UE 115 (e.g., controlling the receiver 410, the transmitter 420, or a transceiver 720 as described with respect to FIG. 7) may increase system efficiency and decrease unnecessary processing at a device.

FIG. 7 shows a block diagram 700 of a device 705 that supports cross-link interference measurement configuration in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to cross-link interference measurement configuration, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CLI configuration manager 720, a cell relationship manager 725, and a CLI measurement manager 730. The communications manager 715 may be an example of aspects of the communications manager 910 described herein.

The CLI configuration manager 720 may receive, from a base station, a configuration message including an indication of one or more resources for performing cross-link interference measurements of additional UEs, where the configuration message includes one or more cell parameters associated with the one or more of the additional UEs.

The cell relationship manager 725 may determine, based on the one or more cell parameters, a relationship between a first serving cell associated with the first UE and a second serving cell associated with a second UE of the one or more of the additional UEs.

The CLI measurement manager 730 may perform a cross-link interference measurement for the second UE during at least a portion of the one or more resources, based on the determined relationship.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
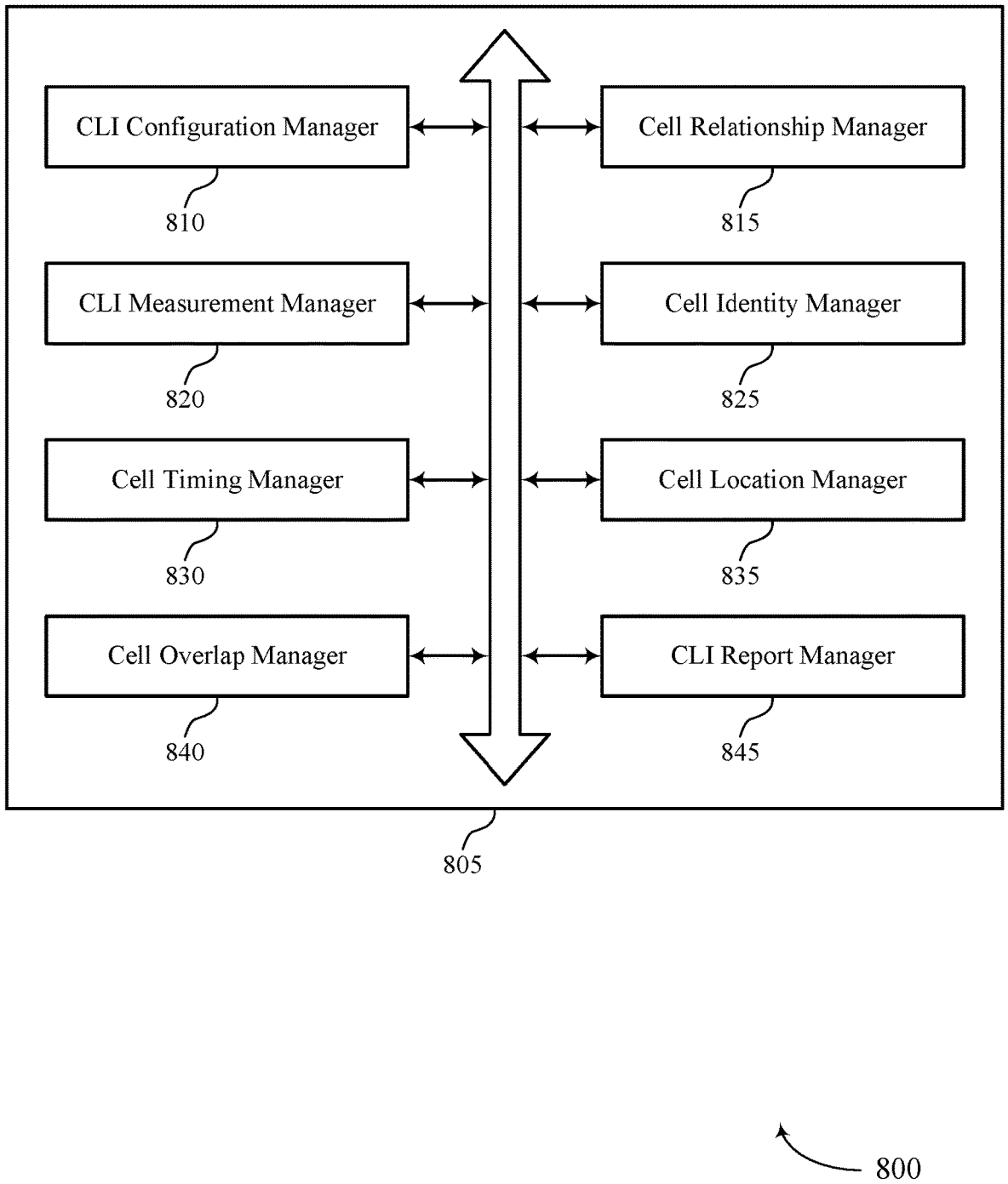
FIG. 8 shows a block diagram of a communications manager that supports cross-link interference measurement configuration in accordance with aspects of the present disclosure.

FIG. 8 shows a block diagram 800 of a communications manager 805 that supports cross-link interference measurement configuration in accordance with aspects of the present disclosure. The communications manager 805 may be an example of aspects of a communications manager 615, a communications manager 715, or a communications manager 910 described herein. The communications manager 805 may include a CLI configuration manager 810, a cell relationship manager 815, a CLI measurement manager 820, a cell identity manager 825, a cell timing manager 830, a cell location manager 835, a cell overlap manager 840, and a CLI report manager 845. Each of these modules may communicate, directly or indirectly, with one another (e.g., via one or more buses).

The CLI configuration manager 810 may receive, from a base station, a configuration message including an indication of one or more resources for performing cross-link interference measurements of additional UEs, where the configuration message includes one or more cell parameters associated with the one or more of the additional UEs.

The cell relationship manager 815 may determine, based on the one or more cell parameters, a relationship between a first serving cell associated with the first UE and a second serving cell associated with a second UE of the one or more of the additional UEs.

The CLI measurement manager 820 may perform a cross-link interference measurement for the second UE during at least a portion of the one or more resources, based on the determined relationship. In some examples, the CLI measurement manager 820 may adjust a cross-link interference measurement window based on the determined offset, where performing the cross-link interference measurement is based on adjusting the cross-link interference measurement window. In some examples, the CLI measurement manager 820 may determine a location of the first UE within a coverage area of the first serving cell. In some examples, the CLI measurement manager 820 may identify, based on the location of the first UE, a subset of the additional UEs for performing the cross-link interference measurements. In some examples, the CLI measurement manager 820 may refrain from performing cross-link interference measurements for UEs of the additional UEs not within the subset of the additional UEs.

The cell identity manager 825 may determine, based on the one or more cell identity indicators, that the first serving cell is the same as the second serving cell. In some examples, the cell identity manager 825 may determine, based on the one or more cell identity indicators, that the first serving cell is different from the second serving cell. In some examples, the cell identity manager 825 may determine whether the first cell identifier is the same as the second serving cell identifier. In some cases, the one or more cell parameters include one or more cell identity indicators. In some cases, the one or more cell identity indicators include a flag in the configuration message, where a first value of the flag indicates a first relationship between the first serving cell and the second serving cell, and a second value of the flag indicates a second relationship between the first serving cell and the second serving cell. In some cases, the first cell is associated with a first cell identifier, and the one or more cell identity indicators include a second serving cell identifier associated with the second serving cell.

The cell timing manager 830 may determine, based on determining that the first serving cell is the same as the second serving cell, a correspondence between an uplink timing for the second UE and a downlink timing for the first UE, where performing the cross-link interference measurements is based on the correspondence between the uplink timing for the second UE and the downlink timing for the first UE. In some examples, the cell timing manager 830 may determine, based on determining that the first serving cell is not the same as the second serving cell, an offset between an uplink timing for the second UE and a downlink timing for the first UE. In some examples, the cell timing manager 830 may adjust a cross-link interference measurement window based on the determined offset, where performing the cross-link interference measurement is based on adjusting the cross-link interference measurement window. In some examples, the cell timing manager 830 may determine a timing difference between a first synchronization block transmitted by the first serving cell and a second synchronization block transmitted by the second serving cell.

In some examples, the cell timing manager 830 may determine, based on determining that the first serving cell and the second serving cell are co-located, a correspondence between an uplink timing for the second UE and a downlink timing for the first UE, where performing the cross-link interference measurements is based on the correspondence between the uplink timing for the second UE and the downlink timing for the first UE. In some examples, the cell timing manager 830 may determine, based on determining that the first serving cell and the second serving cell are not co-located, an offset between an uplink timing for the second UEs and a downlink timing for the first UE.

The cell location manager 835 may determine, based on the cell location indicator, that the first serving cell and the second serving cell are co-located. In some examples, the cell location manager 835 may determine, based on the cell location indicator, that the first serving cell and the second serving cell are not co-located. In some cases, the one or more cell parameters includes a cell location indicator.

The cell overlap manager 840 may determine that an overlap between a first coverage area associated with the first serving cell and a second coverage area associated with the second serving cell satisfies a threshold, where performing the cross-link interference measurements is based on determining that the overlap satisfies the threshold. In some examples, the cell overlap manager 840 may determine that an overlap between a first coverage area associated with the first serving cell and a second coverage area associated with the second serving cell does not satisfy a threshold. In some cases, the one or more cell parameters includes a cell overlap indicator.

The CLI report manager 845 may transmit, to the base station, a cross-link interference report based on performing the cross-link measurements.

Figure 9:
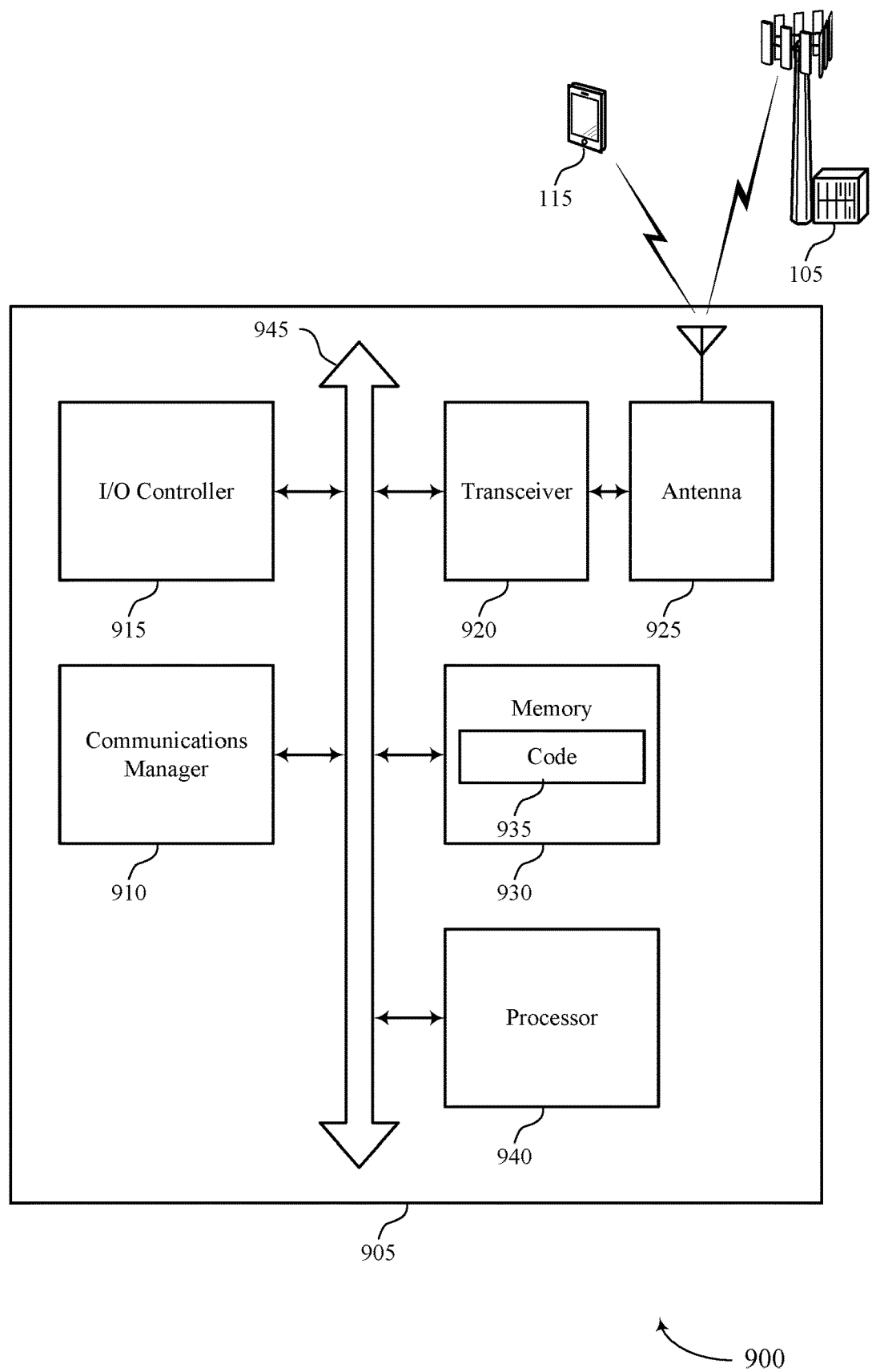
FIG. 9 shows a diagram of a system including a device that supports cross-link interference measurement configuration in accordance with aspects of the present disclosure.

FIG. 9 shows a diagram of a system 900 including a device 905 that supports cross-link interference measurement configuration in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a configuration message including an indication of one or more resources for performing cross-link interference measurements of additional UEs, where the configuration message includes one or more cell parameters associated with the one or more of the additional UEs, determine, based on the one or more cell parameters, a relationship between a first serving cell associated with the first UE and a second serving cell associated with a second UE of the one or more of the additional UEs, and perform a cross-link interference measurement for the second UE during at least a portion of the one or more resources, based on the determined relationship.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting cross-link interference measurement configuration).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
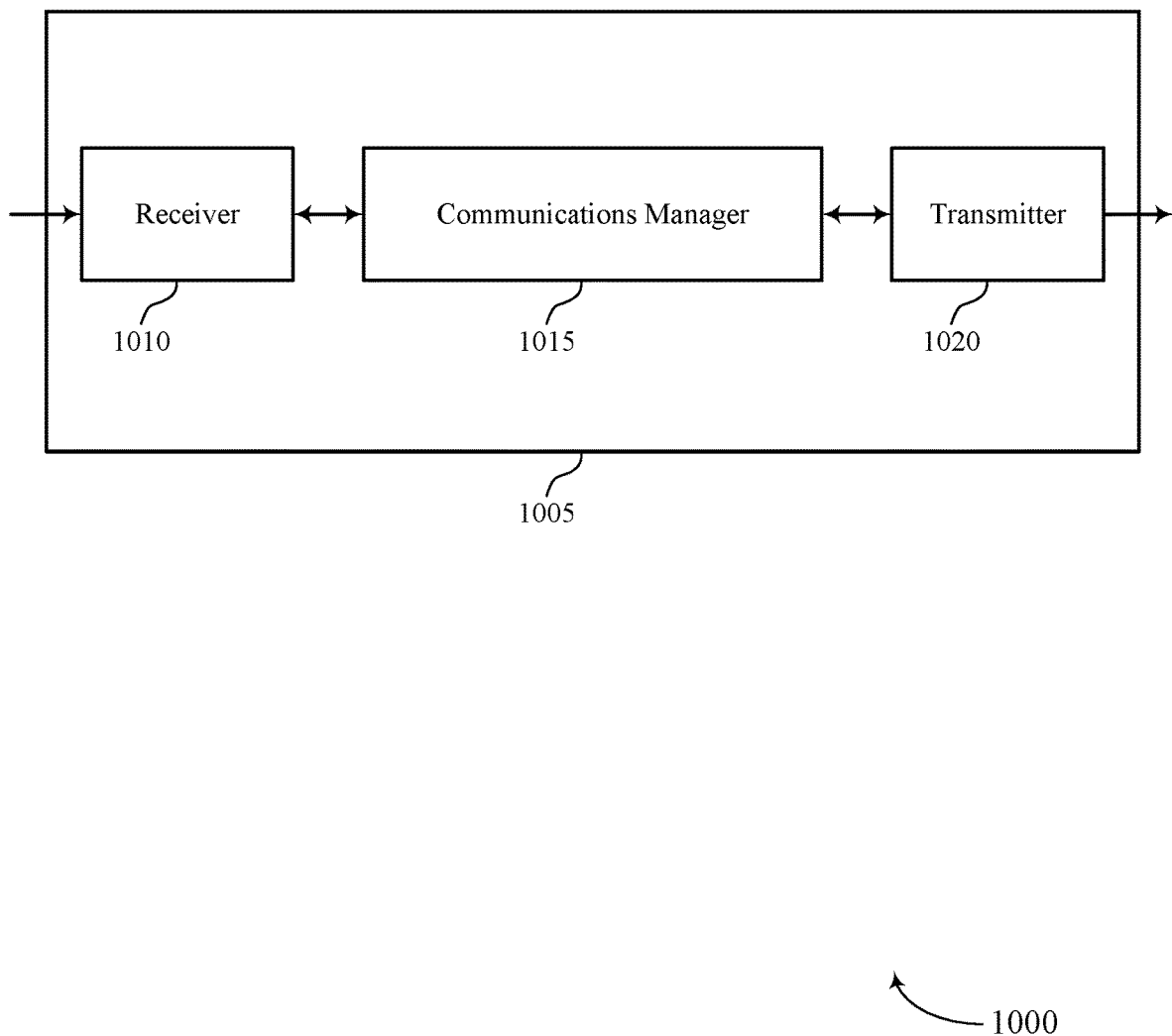
FIGS. 10 and 11 show block diagrams of devices that support cross-link interference measurement configuration in accordance with aspects of the present disclosure.

FIG. 10 shows a block diagram 1000 of a device 1005 that supports cross-link interference measurement configuration in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to cross-link interference measurement configuration, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify, for a first UE served by a first serving cell, one or more cell parameters for cross-link interference for additional UEs, transmit, to the first UE, a configuration message including an indication of the one or more cell parameters and an indication of one or more resources for performing cross-link interference measurements, and receive, from the first UE responsive to the configuration message, a cross-link interference measurement report. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
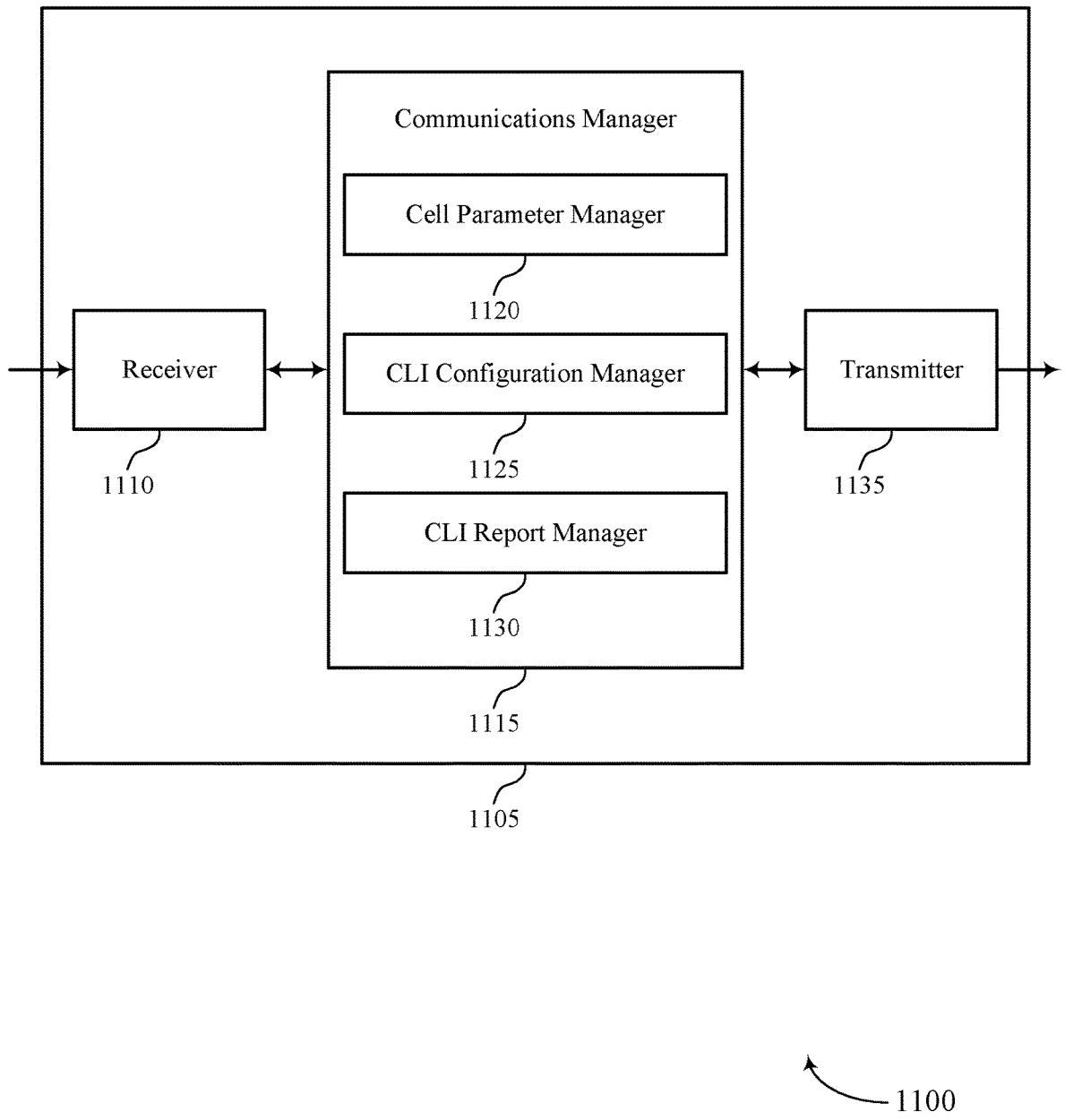

FIG. 11 shows a block diagram 1100 of a device 1105 that supports cross-link interference measurement configuration in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to cross-link interference measurement configuration, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a cell parameter manager 1120, a CLI configuration manager 1125, and a CLI report manager 1130. The communications manager 1115 may be an example of aspects of the communications manager 1310 described herein.

The cell parameter manager 1120 may identify, for a first UE served by a first serving cell, one or more cell parameters for cross-link interference for additional UEs.

The CLI configuration manager 1125 may transmit, to the first UE, a configuration message including an indication of the one or more cell parameters and an indication of one or more resources for performing cross-link interference measurements.

The CLI report manager 1130 may receive, from the first UE responsive to the configuration message, a cross-link interference measurement report.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
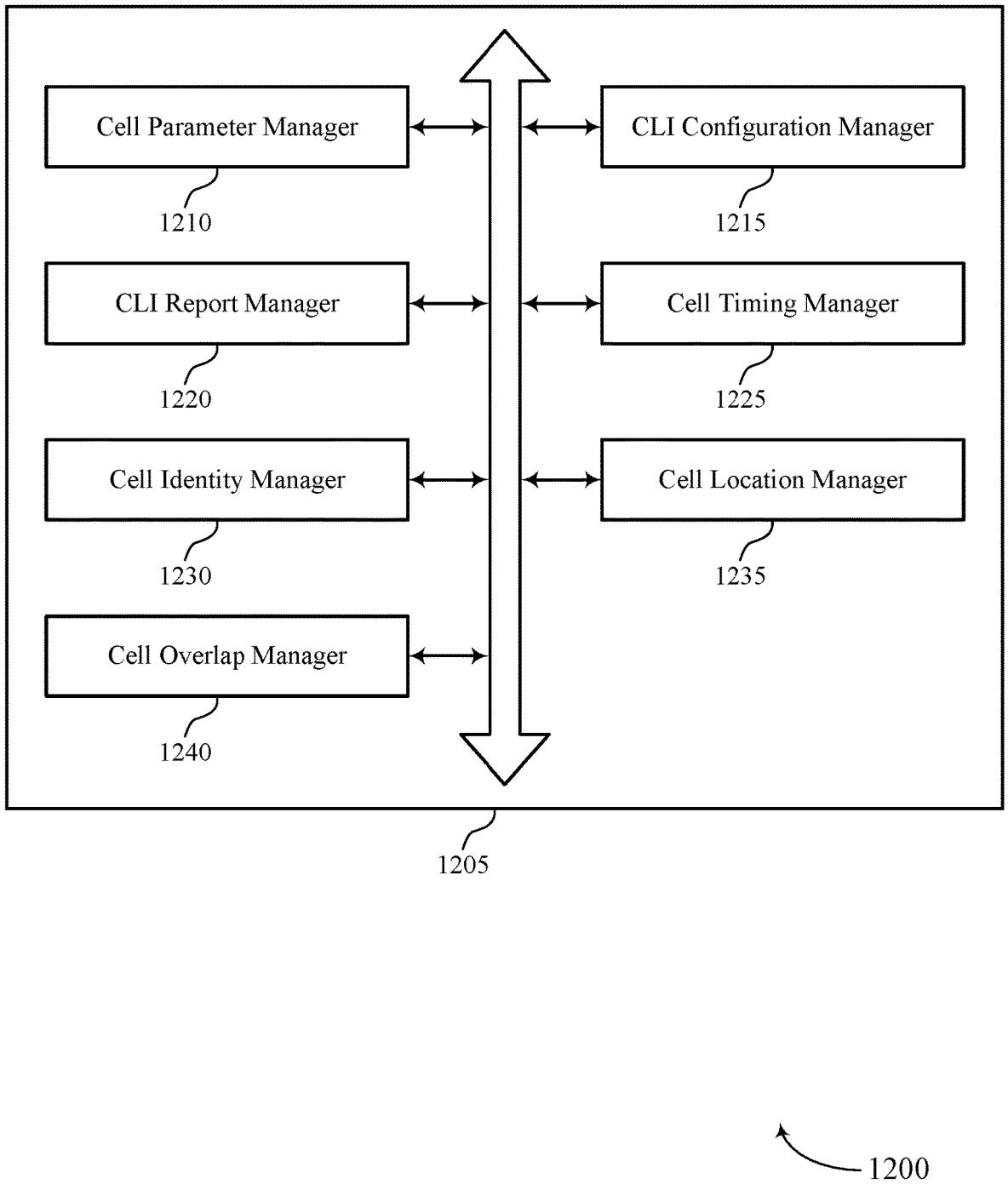
FIG. 12 shows a block diagram of a communications manager that supports cross-link interference measurement configuration in accordance with aspects of the present disclosure.

FIG. 12 shows a block diagram 1200 of a communications manager 1205 that supports cross-link interference measurement configuration in accordance with aspects of the present disclosure. The communications manager 1205 may be an example of aspects of a communications manager 1015, a communications manager 1115, or a communications manager 1310 described herein. The communications manager 1205 may include a cell parameter manager 1210, a CLI configuration manager 1215, a CLI report manager 1220, a cell timing manager 1225, a cell identity manager 1230, a cell location manager 1235, and a cell overlap manager 1240. Each of these modules may communicate, directly or indirectly, with one another (e.g., via one or more buses).

The cell parameter manager 1210 may identify, for a first UE served by a first serving cell, one or more cell parameters for cross-link interference for additional UEs.

The CLI configuration manager 1215 may transmit, to the first UE, a configuration message including an indication of the one or more cell parameters and an indication of one or more resources for performing cross-link interference measurements.

The CLI report manager 1220 may receive, from the first UE responsive to the configuration message, a cross-link interference measurement report.

The cell timing manager 1225 may generate a the one or more cell parameters to include one or more cell identity indicators.

The cell identity manager 1230 may generate the one or more identity indicators to include an indication that the first serving cell is the same as the second serving cell. In some cases, the one or more identity indicators include an indication that the first serving cell is different from the second serving cell. In some cases, the one or more cell identity indicators include a flag in the configuration message, where a first value of the flag indicates a first relationship between the first serving cell and the second serving cell, and a second value of the flag indicates a second relationship between the first serving cell and the second serving cell. In some cases, the first cell is associated with a first cell identifier, and the one or more cell identity indicators include a second serving cell identifier associated with the second serving cell.

The cell location manager 1235 may generate the one or more cell parameters to include a cell location indicator. In some cases, the cell location indicator includes an indication that the first serving cell and the second serving cell are co-located. In some cases, the cell location indicator includes an indication that the first serving cell and the second serving cell are not co-located.

The cell overlap manager 1240 may generate the one or more cell parameters include a cell overlap indicator. In some cases, the cell overlap indicator includes an indication that an overlap between a first coverage area associated with the first serving cell and a second coverage area associated with the second serving cell satisfies a threshold. In some cases, the cell overlap indicator includes an indication that an overlap between a first coverage area associated with the first serving cell and a second coverage area associated with the second serving cell does not satisfy a threshold.

Figure 13:
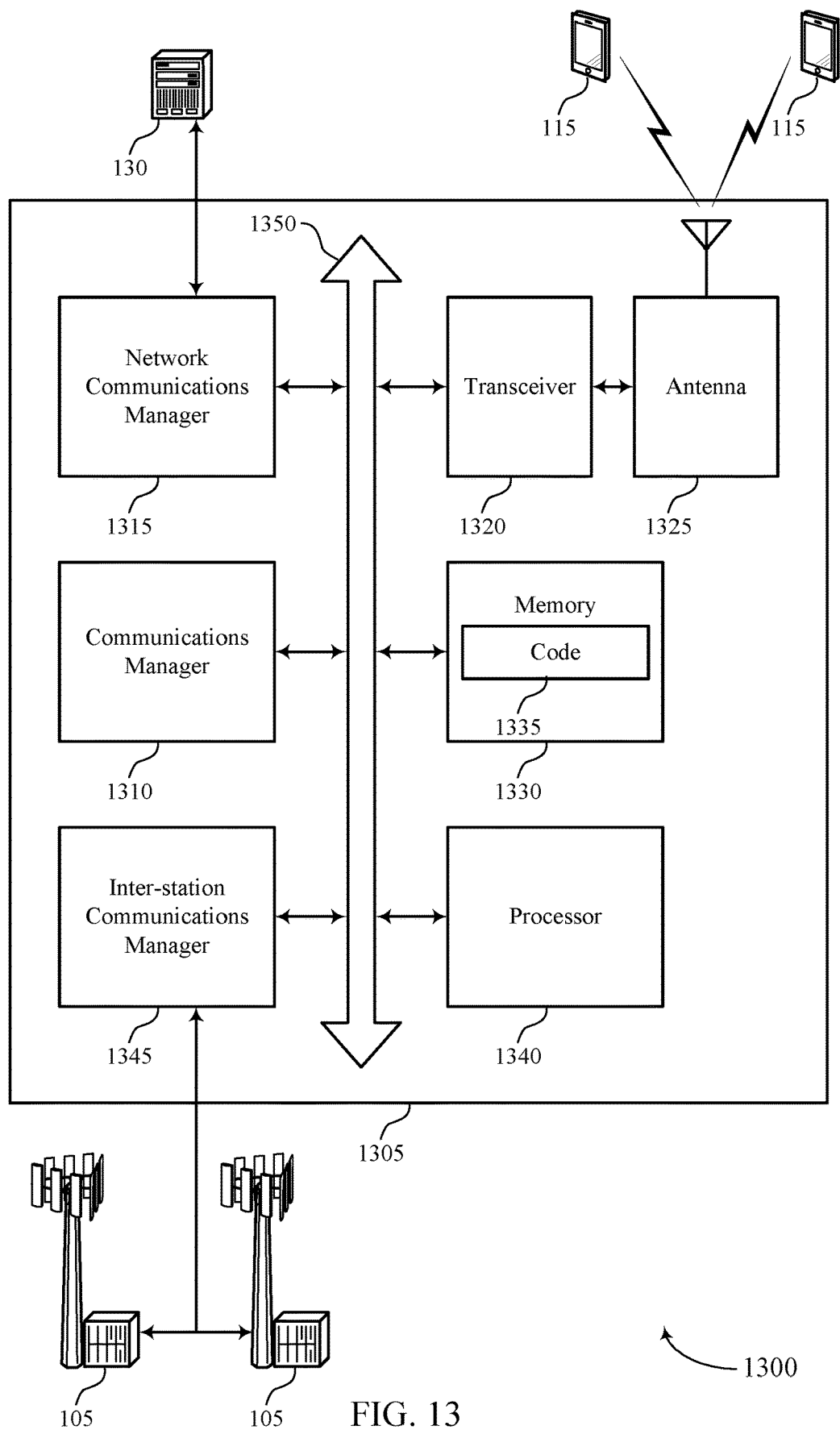
FIG. 13 shows a diagram of a system including a device that supports cross-link interference measurement configuration in accordance with aspects of the present disclosure.

FIG. 13 shows a diagram of a system 1300 including a device 1305 that supports cross-link interference measurement configuration in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify, for a first UE served by a first serving cell, one or more cell parameters for cross-link interference for additional UEs, transmit, to the first UE, a configuration message including an indication of the one or more cell parameters and an indication of one or more resources for performing cross-link interference measurements, and receive, from the first UE responsive to the configuration message, a cross-link interference measurement report.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting cross-link interference measurement configuration).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
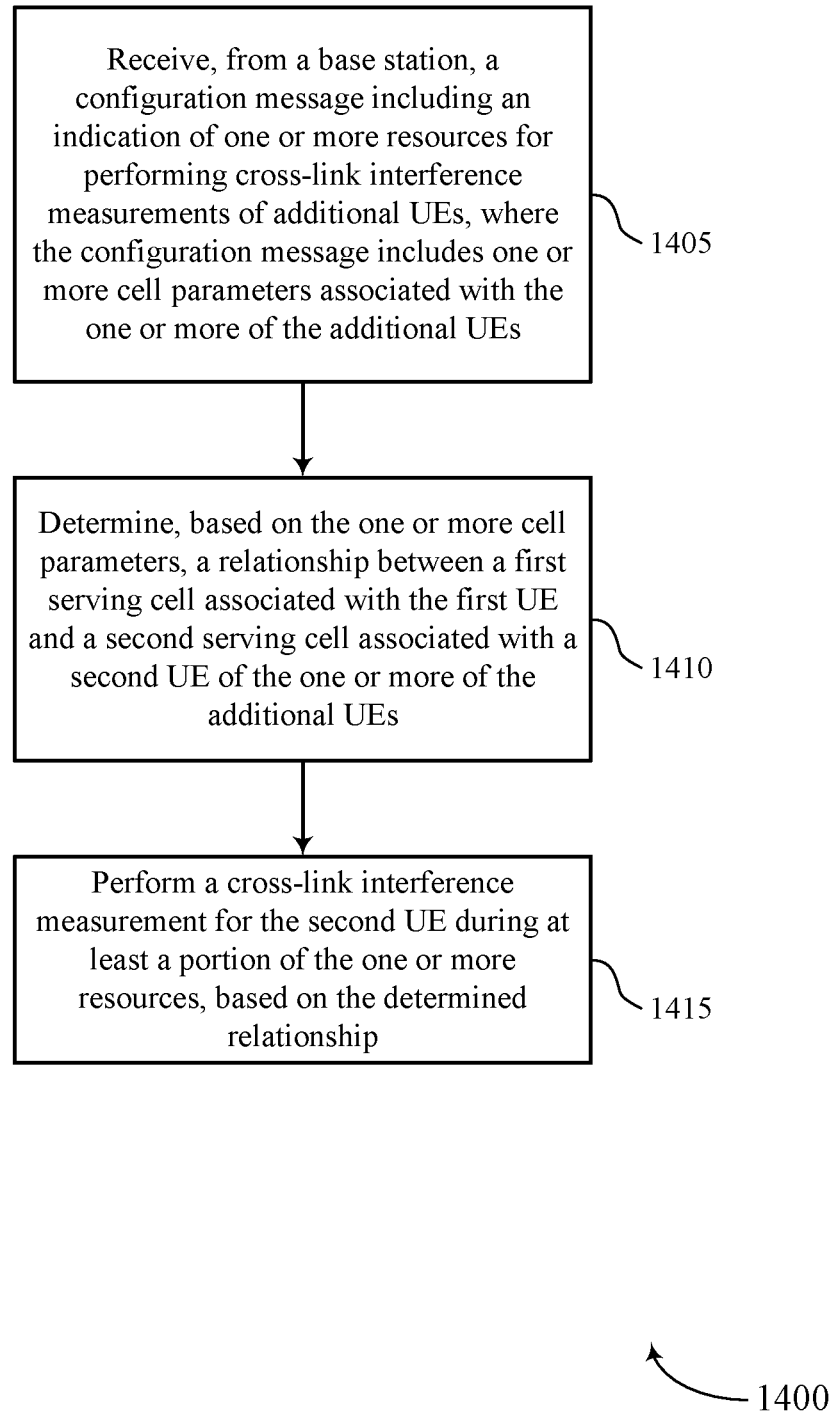
FIGS. 14 through 17 show flowcharts illustrating methods that support cross-link interference measurement configuration in accordance with aspects of the present disclosure.

FIG. 14 shows a flowchart illustrating a method 1400 that supports cross-link interference measurement configuration in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may receive, from a base station, a configuration message including an indication of one or more resources for performing cross-link interference measurements of additional UEs, where the configuration message includes one or more cell parameters associated with the one or more of the additional UEs. The operations of 1405 may be performed according to the methods described herein. In some examples, aspects of the operations of 1405 may be performed by a CLI configuration manager as described with reference to FIGS. 6 through 9.

At 1410, the UE may determine, based on the one or more cell parameters, a relationship between a first serving cell associated with the first UE and a second serving cell associated with a second UE of the one or more of the additional UEs. The operations of 1410 may be performed according to the methods described herein. In some examples, aspects of the operations of 1410 may be performed by a cell relationship manager as described with reference to FIGS. 6 through 9.

At 1415, the UE may perform a cross-link interference measurement for the second UE during at least a portion of the one or more resources, based on the determined relationship. The operations of 1415 may be performed according to the methods described herein. In some examples, aspects of the operations of 1415 may be performed by a CLI measurement manager as described with reference to FIGS. 6 through 9.

Figure 15:
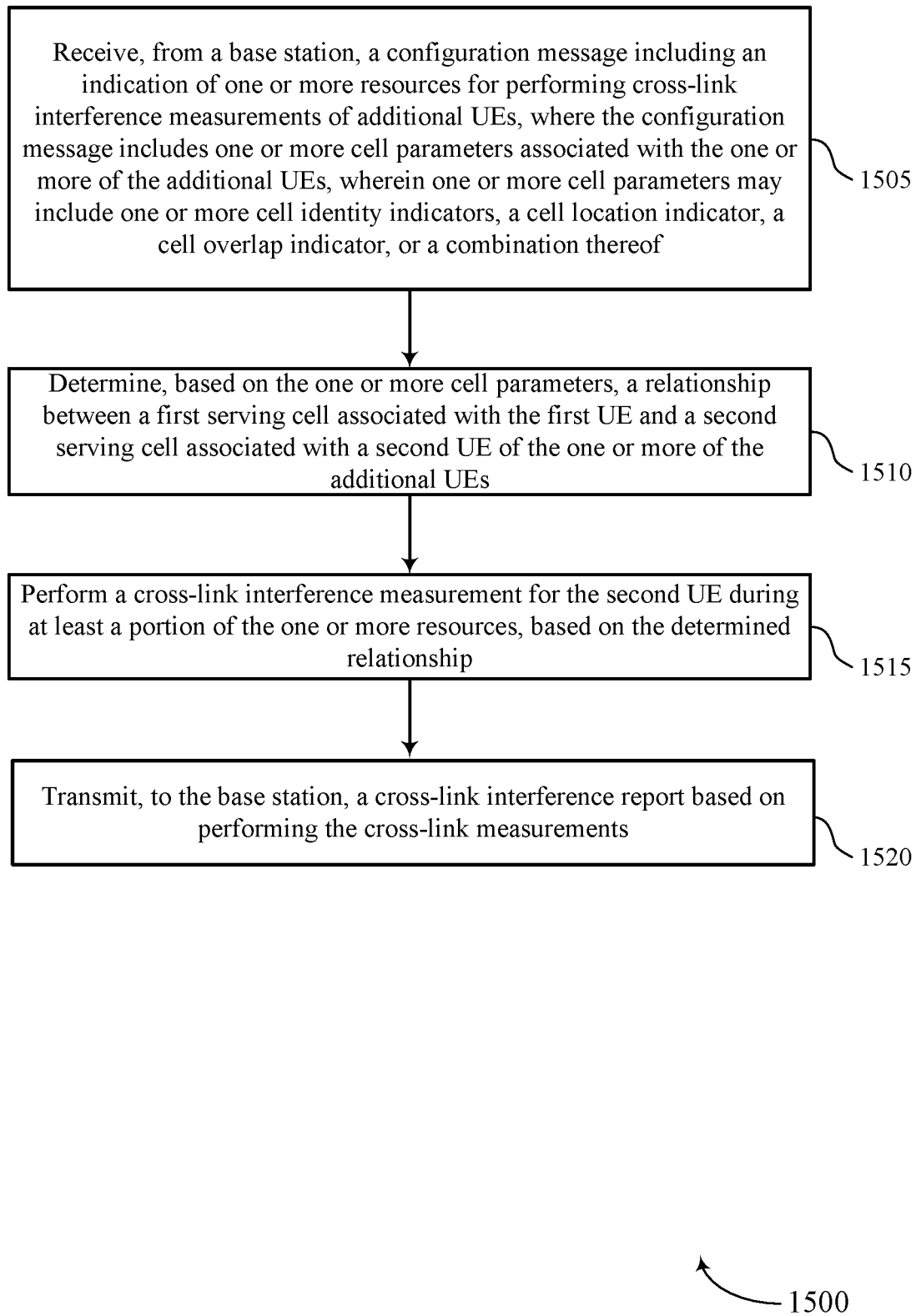

FIG. 15 shows a flowchart illustrating a method 1500 that supports cross-link interference measurement configuration in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1505, the UE may receive, from a base station, a configuration message including an indication of one or more resources for performing cross-link interference measurements of additional UEs, where the configuration message includes one or more cell parameters associated with the one or more of the additional UEs, wherein one or more cell parameters may include one or more cell identity indicators, a cell location indicator, a cell overlap indicator, or a combination thereof. The operations of 1505 may be performed according to the methods described herein. In some examples, aspects of the operations of 1505 may be performed by a CLI configuration manager as described with reference to FIGS. 6 through 9.

At 1510, the UE may determine, based on the one or more cell parameters, a relationship between a first serving cell associated with the first UE and a second serving cell associated with a second UE of the one or more of the additional UEs. The operations of 1530 may be performed according to the methods described herein. In some examples, aspects of the operations of 1530 may be performed by a cell relationship manager as described with reference to FIGS. 6 through 9.

At 1515, the UE may perform a cross-link interference measurement for the second UE during at least a portion of the one or more resources, based on the determined relationship. The operations of 1535 may be performed according to the methods described herein. In some examples, aspects of the operations of 1535 may be performed by a CLI measurement manager as described with reference to FIGS. 6 through 9.

At 1520, the UE may transmit, to the base station, a cross-link interference report based on performing the cross-link measurements. The operations of 1525 may be performed according to the methods described herein. In some examples, aspects of the operations of 1525 may be performed by a CLI report manager as described with reference to FIGS. 6 through 9.

Figure 16:
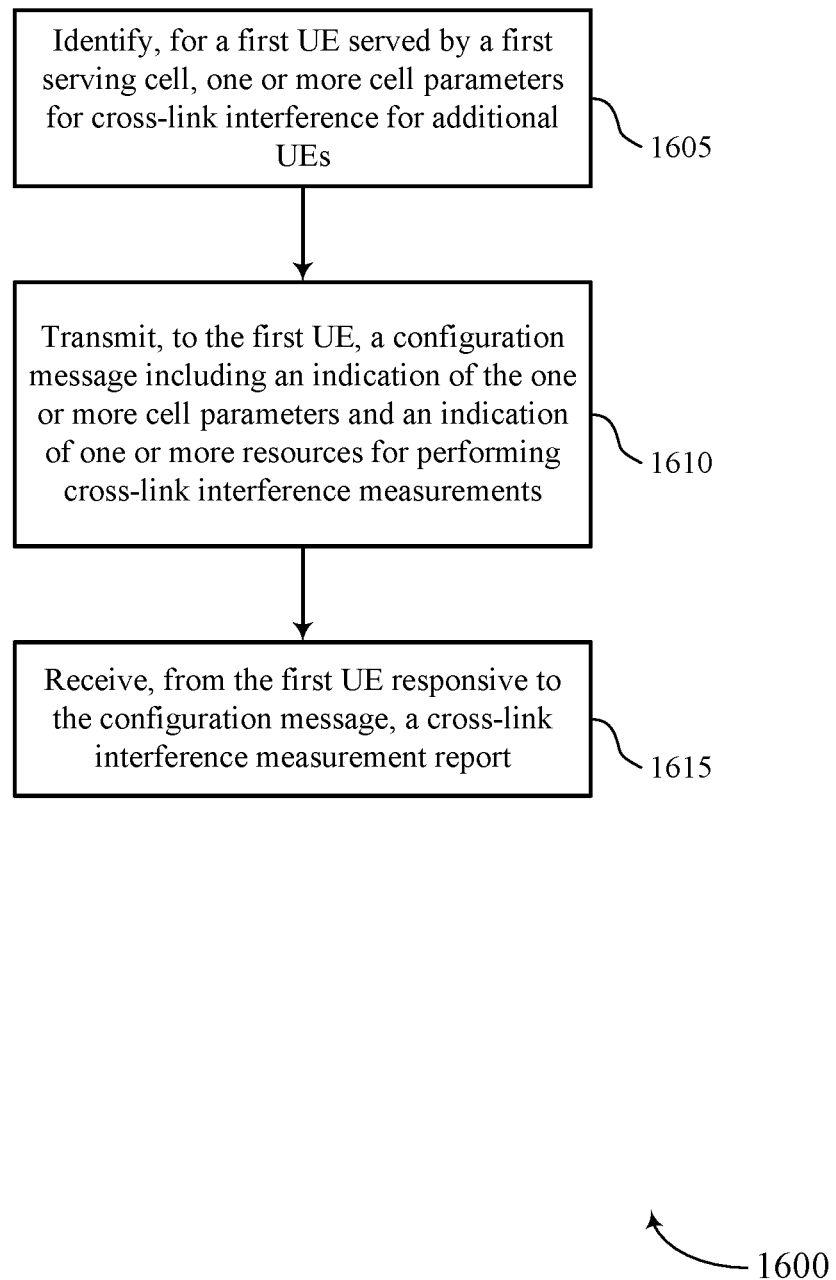

FIG. 16 shows a flowchart illustrating a method 1600 that supports cross-link interference measurement configuration in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1605, the base station may identify, for a first UE served by a first serving cell, one or more cell parameters for cross-link interference for additional UEs. The operations of 1605 may be performed according to the methods described herein. In some examples, aspects of the operations of 1605 may be performed by a cell parameter manager as described with reference to FIGS. 10 through 13.

At 1610, the base station may transmit, to the first UE, a configuration message including an indication of the one or more cell parameters and an indication of one or more resources for performing cross-link interference measurements. The operations of 1610 may be performed according to the methods described herein. In some examples, aspects of the operations of 1610 may be performed by a CLI configuration manager as described with reference to FIGS. 10 through 13.

At 1615, the base station may receive, from the first UE responsive to the configuration message, a cross-link interference measurement report. The operations of 1615 may be performed according to the methods described herein. In some examples, aspects of the operations of 1615 may be performed by a CLI report manager as described with reference to FIGS. 10 through 13.

Figure 17:
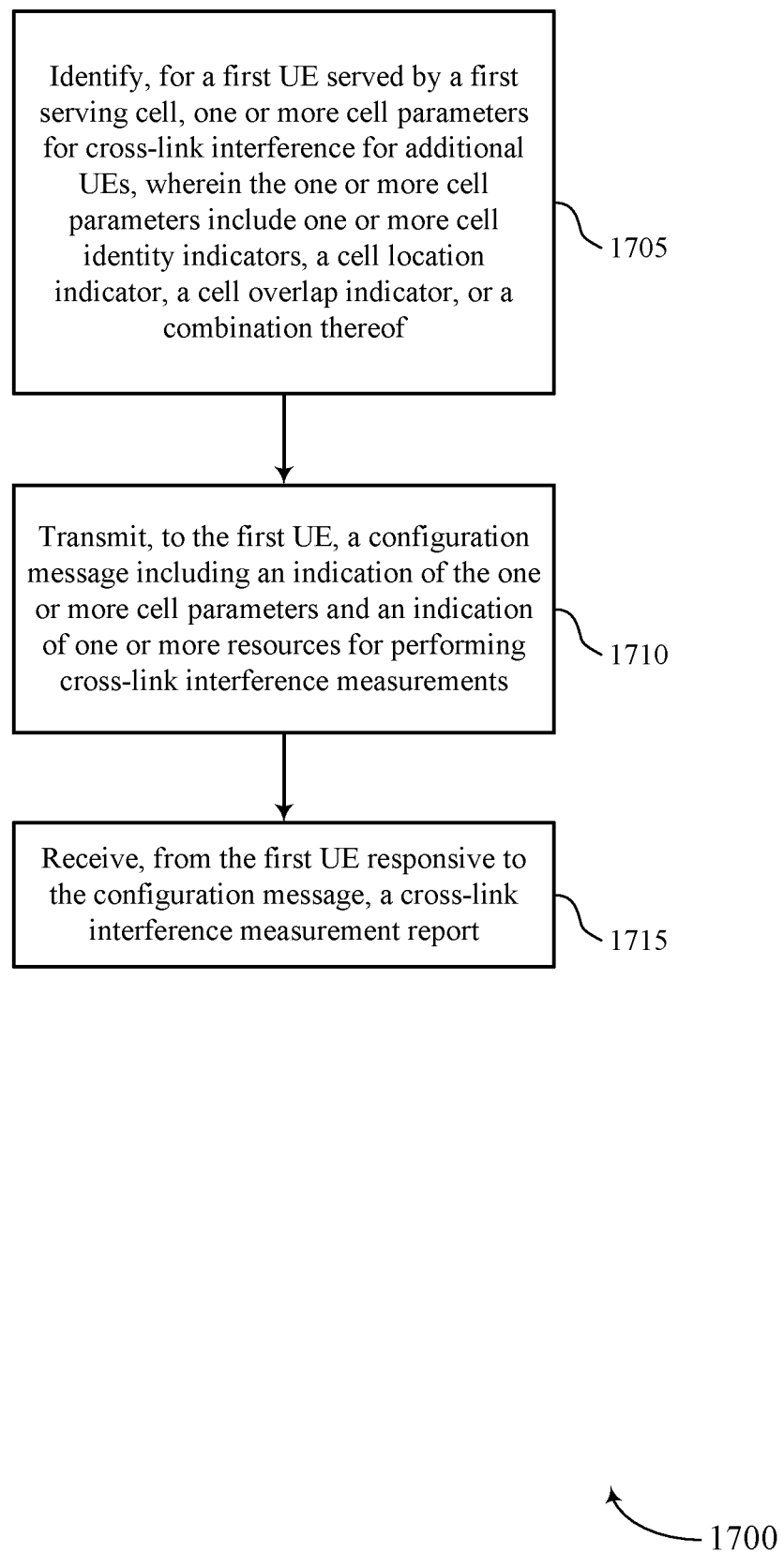

FIG. 17 shows a flowchart illustrating a method 1700 that supports cross-link interference measurement configuration in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1705, the base station may identify, for a first UE served by a first serving cell, one or more cell parameters for cross-link interference for additional UEs, wherein the one or more cell parameters include one or more cell identity indicators, a cell location indicator, a cell overlap indicator, or a combination thereof. The operations of 1705 may be performed according to the methods described herein. In some examples, aspects of the operations of 1705 may be performed by a cell parameter manager as described with reference to FIGS. 10 through 13.

At 1710, the base station may transmit, to the first UE, a configuration message including an indication of the one or more cell parameters and an indication of one or more resources for performing cross-link interference measurements. The operations of 1720 may be performed according to the methods described herein. In some examples, aspects of the operations of 1720 may be performed by a CLI configuration manager as described with reference to FIGS. 10 through 13.

At 1715, the base station may receive, from the first UE responsive to the configuration message, a cross-link interference measurement report. The operations of 1725 may be performed according to the methods described herein. In some examples, aspects of the operations of 1725 may be performed by a CLI report manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Embodiment 1: A method for wireless communications at a first user equipment (UE), comprising: receiving, from a base station, a configuration message comprising an indication of one or more resources for performing cross-link interference measurements of additional UEs, wherein the configuration message comprises one or more cell parameters associated with the one or more of the additional UEs; determining, based at least in part on the one or more cell parameters, a relationship between a first serving cell associated with the first UE and a second serving cell associated with a second UE of the one or more of the additional UEs;

and performing a cross-link interference measurement for the second UE during at least a portion of the one or more resources, based at least in part on the determined relationship.

Embodiment 2: The method of embodiment 1, wherein the one or more cell parameters comprise one or more cell identity indicators.

Embodiment 3: The method of embodiment 2, wherein determining the relationship between the first serving cell and the second serving cell comprises: determining, based at least in part on the one or more cell identity indicators, that the first serving cell is the same as the second serving cell.

Embodiment 4: The method of embodiment 3, further comprising: determining, based at least in part on determining that the first serving cell is the same as the second serving cell, a correspondence between an uplink timing for the second UE and a downlink timing for the first UE, wherein performing the cross-link interference measurements is based at least in part on the correspondence between the uplink timing for the second UE and the downlink timing for the first UE.

Embodiment: 5: The method of any of embodiments 2 to 4, wherein determining the relationship between the first serving cell and the second serving cell comprises: determining, based at least in part on the one or more cell identity indicators, that the first serving cell is different from the second serving cell.

Embodiment 6: The method of embodiment 5, further comprising: determining, based at least in part on determining that the first serving cell is not the same as the second serving cell, an offset between an uplink timing for the second UE and a downlink timing for the first UE; and adjusting a cross-link interference measurement window based at least in part on the determined offset, wherein performing the cross-link interference measurement is based at least in part on adjusting the cross-link interference measurement window.

Embodiment 7: The method of embodiment 6, wherein determining the offset between the uplink timing for the second UE and the uplink timing for the first UE comprises: determining a timing difference between a first synchronization block transmitted by the first serving cell and a second synchronization block transmitted by the second serving cell.

Embodiment 8: The method of any of embodiments 2 to 7, wherein the one or more cell identity indicators comprise a flag in the configuration message, wherein a first value of the flag indicates a first relationship between the first serving cell and the second serving cell, and a second value of the flag indicates a second relationship between the first serving cell and the second serving cell.

Embodiment 9: The method of any of embodiments 2 to 7, wherein the first cell is associated with a first cell identifier, and the one or more cell identity indicators comprise a second serving cell identifier associated with the second serving cell.

Embodiment 10: The method of embodiment 9, wherein determining the relationship between the first serving cell and the second serving cell comprises: determining whether the first cell identifier is the same as the second serving cell identifier.

Embodiment 11: The method of any of embodiments 1 to 11, wherein the one or more cell parameters comprises a cell location indicator.

Embodiment 12: The method of embodiment 11, wherein determining the relationship between the first serving cell and the second serving cell comprises: determining, based at least in part on the cell location indicator, that the first serving cell and the second serving cell are co-located.

Embodiment 13: The method of embodiment 12, further comprising: determining, based at least in part on determining that the first serving cell and the second serving cell are co-located, a correspondence between an uplink timing for the second UE and a downlink timing for the first UE, wherein performing the cross-link interference measurements is based at least in part on the correspondence between the uplink timing for the second UE and the downlink timing for the first UE.

Embodiment 14: The method of embodiment 11, wherein determining the relationship between the first serving cell and the second serving cell comprises: determining, based at least in part on the cell location indicator, that the first serving cell and the second serving cell are not co-located.

Embodiment 15: The method of embodiment 14, further comprising: determining, based at least in part on determining that the first serving cell and the second serving cell are not co-located, an offset between an uplink timing for the second UEs and a downlink timing for the first UE; and adjusting a cross-link interference measurement window based at least in part on the determined offset, wherein performing the cross-link interference measurement is based at least in part on adjusting the cross-link interference measurement window.

Embodiment 16: The method of embodiment 15, wherein determining the offset between the uplink timing for the second UE and the uplink timing for the first UE comprises: determining a timing difference between a first synchronization block transmitted by the first serving cell and a second synchronization block transmitted by the second serving cell.

Embodiment 17: The method of any of embodiments 1 to 16, wherein the one or more cell parameters comprises a cell overlap indicator.

Embodiment 18: The method of embodiment 17, wherein determining the relationship between the first serving cell and the second serving cell comprises: determining that an overlap between a first coverage area associated with the first serving cell and a second coverage area associated with the second serving cell satisfies a threshold, wherein performing the cross-link interference measurements is based at least in part on determining that the overlap satisfies the threshold.

Embodiment 19: The method of embodiment 17, wherein determining the relationship between the first serving cell and the second serving cell comprises: determining that an overlap between a first coverage area associated with the first serving cell and a second coverage area associated with the second serving cell does not satisfy a threshold.

Embodiment 20: The method of embodiment 19, further comprising: determining a location of the first UE within a coverage area of the first serving cell; identifying, based at least in part on the location of the first UE, a subset of the additional UEs for performing the cross-link interference measurements; and refraining from performing cross-link interference measurements for UEs of the additional UEs not within the subset of the additional UEs.

Embodiment 21: The method of any of embodiments 1 to 20, further comprising: transmitting, to the base station, a cross-link interference report based at least in part on performing the cross-link measurements.

Embodiment 22: A method for wireless communications at a base station, comprising: identifying, for a first user equipment (UE) served by a first serving cell, one or more cell parameters for cross-link interference for additional UEs; transmitting, to the first UE, a configuration message comprising an indication of the one or more cell parameters and an indication of one or more resources for performing cross-link interference measurements; and receiving, from the first UE responsive to the configuration message, a cross-link interference measurement report.

Embodiment 23: The method of embodiment 22, wherein the one or more cell parameters comprise one or more cell identity indicators.

Embodiment 24: The method of embodiment 23, wherein the one or more identity indicators comprise an indication that the first serving cell is the same as the second serving cell.

Embodiment 25: The method of any of embodiments 23 to 24, wherein the one or more identity indicators comprise an indication that the first serving cell is different from the second serving cell.

Embodiment 26: The method of embodiment 23, wherein the one or more cell identity indicators comprise a flag in the configuration message, wherein a first value of the flag indicates a first relationship between the first serving cell and the second serving cell, and a second value of the flag indicates a second relationship between the first serving cell and the second serving cell.

Embodiment 27: The method of embodiment 23, wherein the first cell is associated with a first cell identifier, and the one or more cell identity indicators comprise a second serving cell identifier associated with the second serving cell.

Embodiment 28: The method of any of embodiments 22 to 28, wherein the one or more cell parameters comprise a cell location indicator.

Embodiment 29: The method of embodiment 28, wherein the cell location indicator comprises an indication that the first serving cell and the second serving cell are co-located.

Embodiment 30: The method of embodiment 28, wherein the cell location indicator comprises an indication that the first serving cell and the second serving cell are not co-located.

Embodiment 31: The method of any of embodiments 22 to 30, wherein the one or more cell parameters comprise a cell overlap indicator.

Embodiment 32: The method of embodiment 31, wherein the cell overlap indicator comprises an indication that an overlap between a first coverage area associated with the first serving cell and a second coverage area associated with the second serving cell satisfies a threshold.

Embodiment 33: The method of embodiment 31, wherein the cell overlap indicator comprises an indication that an overlap between a first coverage area associated with the first serving cell and a second coverage area associated with the second serving cell does not satisfy a threshold.

Embodiment 34: An apparatus for wireless communications comprising a processor, a memory in electronic communication with the processor, and instructions stored in the memory and executable by the processor to cause the apparatus to perform a method of any of embodiments 1 to 21.

Embodiment 35: An apparatus for wireless communications comprising a processor, a memory in electronic communication with the processor, and instructions stored in the memory and executable by the processor to cause the apparatus to perform a method of any of embodiments 22 to 33.

Embodiment 36: An apparatus comprising at least one means for performing a method of any of embodiments 1 to 21.

Embodiment 37: An apparatus comprising at least one means for performing a method of any of embodiments 22 to 33.

Embodiment 38: A non-transitory computer-readable medium storing code for wireless communications, the code comprising instructions executable by a processor to perform a method of any of embodiments 1 to 21.

Embodiment 39: A non-transitory computer-readable medium storing code for wireless communications, the code comprising instructions executable by a processor to perform a method of any of embodiments 22 to 33.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving, from a network entity, a configuration message comprising an indication of one or more resources for performing cross-link interference measurements of additional UEs, wherein the configuration message comprises one or more cell parameters associated with one or more of the additional UEs;
   determining, based at least in part on the one or more cell parameters, a relationship between a first serving cell associated with the first UE and a second serving cell associated with a second UE of the one or more of the additional UEs; and
   performing a cross-link interference measurement for the second UE during at least a portion of the one or more resources, based at least in part on the determined relationship.

2. The method of claim 1, wherein the one or more cell parameters comprise one or more cell identity indicators.

3. The method of claim 2, wherein determining the relationship between the first serving cell and the second serving cell comprises:
   determining, based at least in part on the one or more cell identity indicators, that the first serving cell is the same as the second serving cell.

4. The method of claim 3, further comprising:
   determining, based at least in part on determining that the first serving cell is the same as the second serving cell, a correspondence between an uplink timing for the second UE and a downlink timing for the first UE, wherein performing the cross-link interference measurements is based at least in part on the correspondence between the uplink timing for the second UE and the downlink timing for the first UE.

5. The method of claim 2, wherein determining the relationship between the first serving cell and the second serving cell comprises:
   determining, based at least in part on the one or more cell identity indicators, that the first serving cell is different from the second serving cell.

6. The method of claim 5, further comprising:
   determining, based at least in part on determining that the first serving cell is not the same as the second serving cell, an offset between an uplink timing for the second UE and a downlink timing for the first UE; and
   adjusting a cross-link interference measurement window based at least in part on the determined offset, wherein performing the cross-link interference measurement is based at least in part on adjusting the cross-link interference measurement window.

7. The method of claim 6, wherein determining the offset between the uplink timing for the second UE and the uplink timing for the first UE comprises:
   determining a timing difference between a first synchronization block transmitted by the first serving cell and a second synchronization block transmitted by the second serving cell.

8. The method of claim 2, wherein the one or more cell identity indicators comprise a flag in the configuration message, wherein a first value of the flag indicates a first relationship between the first serving cell and the second serving cell, and a second value of the flag indicates a second relationship between the first serving cell and the second serving cell.

9. The method of claim 2, wherein the first serving cell is associated with a first cell identifier, and the one or more cell identity indicators comprise a second serving cell identifier associated with the second serving cell.

10. The method of claim 9, wherein determining the relationship between the first serving cell and the second serving cell comprises:
determining whether the first cell identifier is the same as the second serving cell identifier.

11. The method of claim 1, wherein the one or more cell parameters comprises a cell location indicator.

12. The method of claim 11, wherein determining the relationship between the first serving cell and the second serving cell comprises:
determining, based at least in part on the cell location indicator, that the first serving cell and the second serving cell are co-located.

13. The method of claim 12, further comprising:
determining, based at least in part on determining that the first serving cell and the second serving cell are co-located, a correspondence between an uplink timing for the second UE and a downlink timing for the first UE, wherein performing the cross-link interference measurements is based at least in part on the correspondence between the uplink timing for the second UE and the downlink timing for the first UE.

14. The method of claim 11, wherein determining the relationship between the first serving cell and the second serving cell comprises:
determining, based at least in part on the cell location indicator, that the first serving cell and the second serving cell are not co-located.

15. The method of claim 14, further comprising:
determining, based at least in part on determining that the first serving cell and the second serving cell are not co-located, an offset between an uplink timing for the second UE and a downlink timing for the first UE; and
adjusting a cross-link interference measurement window based at least in part on the determined offset, wherein performing the cross-link interference measurement is based at least in part on adjusting the cross-link interference measurement window.

16. The method of claim 15, wherein determining the offset between the uplink timing for the second UE and the uplink timing for the first UE comprises:
determining a timing difference between a first synchronization block transmitted by the first serving cell and a second synchronization block transmitted by the second serving cell.

17. The method of claim 1, wherein the one or more cell parameters comprises a cell overlap indicator.

18. The method of claim 17, wherein determining the relationship between the first serving cell and the second serving cell comprises:
determining that an overlap between a first coverage area associated with the first serving cell and a second coverage area associated with the second serving cell satisfies a threshold, wherein performing the cross-link interference measurements is based at least in part on determining that the overlap satisfies the threshold.

19. The method of claim 17, wherein determining relationship between the first serving cell and the second serving cell comprises:
determining that an overlap between a first coverage area associated with the first serving cell and a second coverage area associated with the second serving cell does not satisfy a threshold.

20. The method of claim 19, further comprising:
determining a location of the first UE within a coverage area of the first serving cell;
identifying, based at least in part on the location of the first UE, a subset of the additional UEs for performing the cross-link interference measurements; and
refraining from performing cross-link interference measurements for UEs of the additional UEs not within the subset of the additional UEs.

21. The method of claim 1, further comprising:
transmitting, to the network entity, a cross-link interference report based at least in part on performing the cross-link interference measurements.

22. A method for wireless communications at a network entity, comprising:
identifying, for a first user equipment (UE) served by a first serving cell, one or more cell parameters for cross-link interference for additional UEs, wherein the one or more cell parameters comprise one or more cell identity indicators, and wherein the one or more cell identity indicators comprise an indication that the first serving cell is the same as a second serving cell or an indication that the first serving cell is different from the second serving cell;
transmitting, to the first UE, a configuration message comprising an indication of the one or more cell parameters and an indication of one or more resources for performing cross-link interference measurements; and
receiving, from the first UE responsive to the configuration message, a cross-link interference measurement report.

23. The method of claim 22, wherein the one or more cell identity indicators comprise a flag in the configuration message, wherein a first value of the flag indicates a first relationship between the first serving cell and the second serving cell, and a second value of the flag indicates a second relationship between the first serving cell and the second serving cell.

24. The method of claim 22, wherein the first cell is associated with a first cell identifier, and the one or more cell identity indicators comprise a second serving cell identifier associated with the second serving cell.

25. The method of claim 22, wherein the one or more cell parameters comprise a cell location indicator, wherein the cell location indicator comprises an indication that the first serving cell and the second serving cell are co-located or an indication that the first serving cell and the second serving cell are not co-located.

26. The method of claim 22, wherein the one or more cell parameters comprise a cell overlap indicator, wherein the cell overlap indicator comprises an indication that an overlap between a first coverage area associated with the first serving cell and a second coverage area associated with the second serving cell satisfies a threshold or an indication that the overlap does not satisfy the threshold.

27. An apparatus for wireless communications at a first user equipment (UE), comprising:
a processor,
memory coupled with the processor; and
instructions stored in the memory and executable by the processor to cause the apparatus to:

receive, from a network entity, a configuration message comprising an indication of one or more resources for performing cross-link interference measurements of additional UEs, wherein the configuration message comprises one or more cell parameters associated with one or more of the additional UEs;

determine, based at least in part on the one or more cell parameters, a relationship between a first serving cell associated with the first UE and a second serving cell associated with a second UE of the one or more of the additional UEs; and perform a cross-link interference measurement for the second UE during at least a portion of the one or more resources, based at least in part on the determined relationship.

28. An apparatus for wireless communications at a network entity, comprising:

a processor, memory coupled with the processor; and instructions stored in the memory and executable by the processor to cause the apparatus to:

identify, for a first user equipment (UE) served by a first serving cell, one or more cell parameters for cross-link interference for additional UEs, wherein the one or more cell parameters comprise one or more cell identity indicators, and wherein the one or more cell identity indicators comprise an indication that the first serving cell is the same as a second serving cell or an indication that the first serving cell is different from the second serving cell;

transmit, to the first UE, a configuration message comprising an indication of the one or more cell parameters and an indication of one or more resources for performing cross-link interference measurements; and receive, from the first UE responsive to the configuration message, a cross-link interference measurement report.

* * * * *